(12) United States Patent
Patil et al.

(10) Patent No.: US 12,050,118 B2
(45) Date of Patent: Jul. 30, 2024

(54) METHOD AND DEVICE TO MEASURE MULTIPHASE FLOW

(71) Applicant: The Texas A&M University System, College Station, TX (US)

(72) Inventors: Abhay R. Patil, College Station, TX (US); Gerald Morrison, College Station, TX (US); Joshua A. Vandervort, Cypress, TX (US)

(73) Assignee: The Texas A&M University System, College Station, TX (US)

( * ) Notice: Subject to any disclaimer, the term of this patent is extended or adjusted under 35 U.S.C. 154(b) by 355 days.

(21) Appl. No.: 17/424,561

(22) PCT Filed: Jan. 28, 2020

(86) PCT No.: PCT/US2020/015354
§ 371 (c)(1),
(2) Date: Jul. 21, 2021

(87) PCT Pub. No.: WO2020/159950
PCT Pub. Date: Aug. 6, 2020

(65) Prior Publication Data
US 2022/0099466 A1 Mar. 31, 2022

Related U.S. Application Data

(60) Provisional application No. 62/797,798, filed on Jan. 28, 2019.

(51) Int. Cl.
*G01F 1/10* (2006.01)
*G01F 1/34* (2006.01)

(52) U.S. Cl.
CPC . *G01F 1/10* (2013.01); *G01F 1/34* (2013.01)

(58) Field of Classification Search
CPC ... G01F 1/10; G01F 1/115; G01F 1/34; G01F 1/86; G01F 1/88
See application file for complete search history.

(56) References Cited

U.S. PATENT DOCUMENTS 5,831,176 A * 11/1998 Morgenthale ......... G01F 15/024
73/861.83
6,532,826 B1 3/2003 Dou
(Continued)

OTHER PUBLICATIONS

Young, Lee, International Search Report for PCT/US20/15354, Apr. 24, 2020 [1 page].

*Primary Examiner* — Erika J. Villaluna
(74) *Attorney, Agent, or Firm* — Winstead PC

(57) ABSTRACT

In an embodiment, a method for measuring parameters of a liquid, where the method includes measuring pressure drops across a flow meter, measuring pressure upstream of the flow meter, and identifying at least one liquid parameter based, at least in part, on a correlation of a change in a multiphase flow parameter to pulse output. In an additional embodiment, a measuring apparatus for measuring parameters of a liquid, where the measuring apparatus includes an electronic control operable to measure pressure drops across the measuring apparatus, measure pressure upstream of the measuring apparatus, and correlate a change in a multiphase parameter to measured pulse output of the measuring apparatus.

18 Claims, 22 Drawing Sheets

(56) References Cited

U.S. PATENT DOCUMENTS

| | | | |
|---|---|---|---|
| 6,692,535 B2 * | 2/2004 | Olivier | G01F 1/90 |
| | | | 702/45 |
| 8,739,635 B2 | 6/2014 | Bruno et al. | |
| 2004/0031328 A1 | 2/2004 | Henry et al. | |
| 2007/0006640 A1 | 1/2007 | Gysling | |
| 2013/0174668 A1 | 7/2013 | Baker et al. | |
| 2017/0350740 A1 | 12/2017 | Mohr et al. | |
| 2020/0235639 A1 * | 7/2020 | Holm | G01F 1/10 |

* cited by examiner

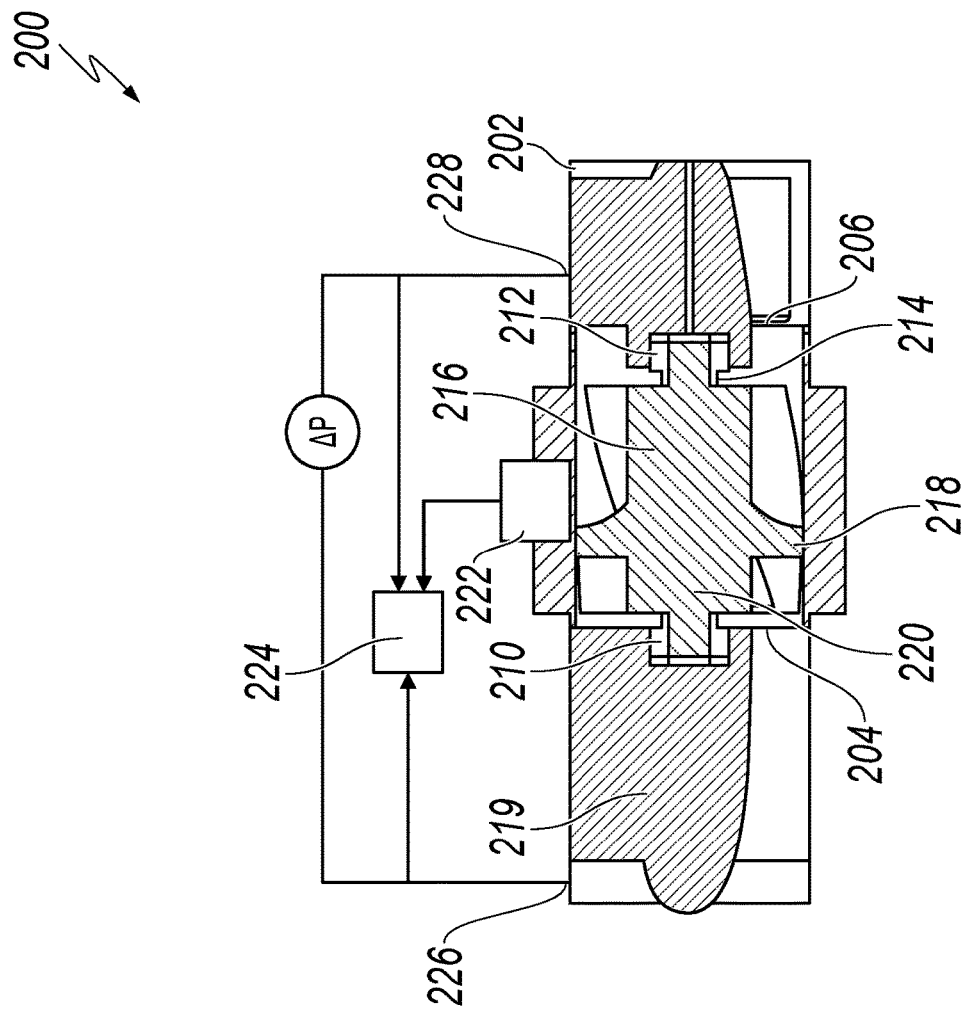
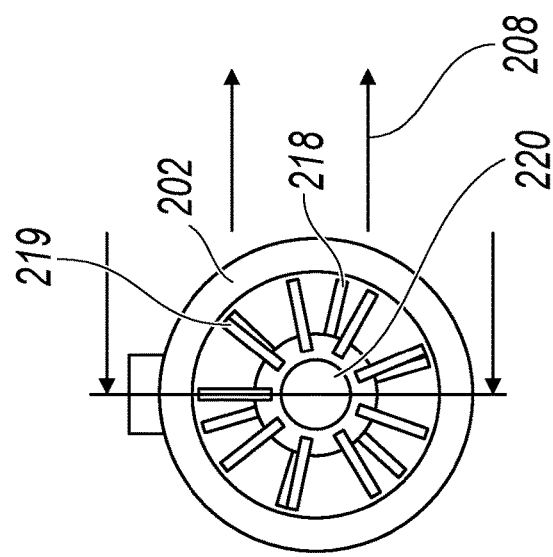
FIG. 2B
FIG. 2A

METHOD AND DEVICE TO MEASURE MULTIPHASE FLOW

CROSS-REFERENCE TO RELATED APPLICATIONS

This patent application claims priority to, and incorporates by reference the entire disclosure of U.S. Provisional Patent Application No. 62/797,798, filed on Jan. 28, 2019.

TECHNICAL FIELD

The present disclosure relates to flow measurement and more particularly, but not by way of limitation, to measurement of a multi-phase fluid by measuring pressure drops across a flow meter, measuring pressure upstream of the flow meter, and identifying at least one liquid parameter based, at least in part, on a correlation of a change in a multiphase flow parameter to pulse output.

BACKGROUND

This section provides background information to facilitate a better understanding of the various aspects of the disclosure. It should be understood that the statements in this section of this document are to be read in this light, and not as admissions of prior art.

Conventional solutions for multiphase metering systems require expensive and cumbersome test separators, with associated high maintenance, and field personnel intervention. These conventional solutions do not lend themselves to continuous automated monitoring or metering. Moreover, with diminishing oil resources, oil companies are now frequently confronted with the need to recover hydrocarbons from marginally economical reservoirs. In order to ensure economic viability of these accumulations, wells may have to be completed subsea, or crude oil from several wells sent to a common production facility with excess processing capacity. The economic constraints on such developments do not lend themselves to continued deployment of three-phase separators as primary measurement devices.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, a method for measuring parameters of a liquid, where the method includes measuring pressure drops across a flow meter, measuring pressure upstream of the flow meter, and identifying at least one liquid parameter based, at least in part, on a correlation of a change in a multiphase flow parameter to pulse output.

In an embodiment, a method of measuring parameters of a gas, where the method includes measuring pressure drops across a flow meter, measuring pressure upstream of the flow meter, and identifying at least one liquid parameter based, at least in part, on a correlation of a change in a multiphase flow parameter to pulse output.

In another embodiment, a measuring apparatus for measuring parameters of a liquid, where the measuring apparatus includes an electronic control operable to measure pressure drops across the measuring apparatus, measure pressure upstream of the measuring apparatus, and correlate a change in a multiphase parameter to measured pulse output of the measuring apparatus.

BRIEF DESCRIPTION OF THE DRAWINGS

A more complete understanding of the subject matter of the present disclosure may be obtained by reference to the following Detailed Description when taken in conjunction with the accompanying Drawings wherein:

FIG. 2A is a front view of a flow meter according to aspects of the disclosure;

FIG. 2B is a cross-sectional view of the flow meter of FIG. 2A about line B-B according to aspects of the disclosure;

DETAILED DESCRIPTION

Figure 1:
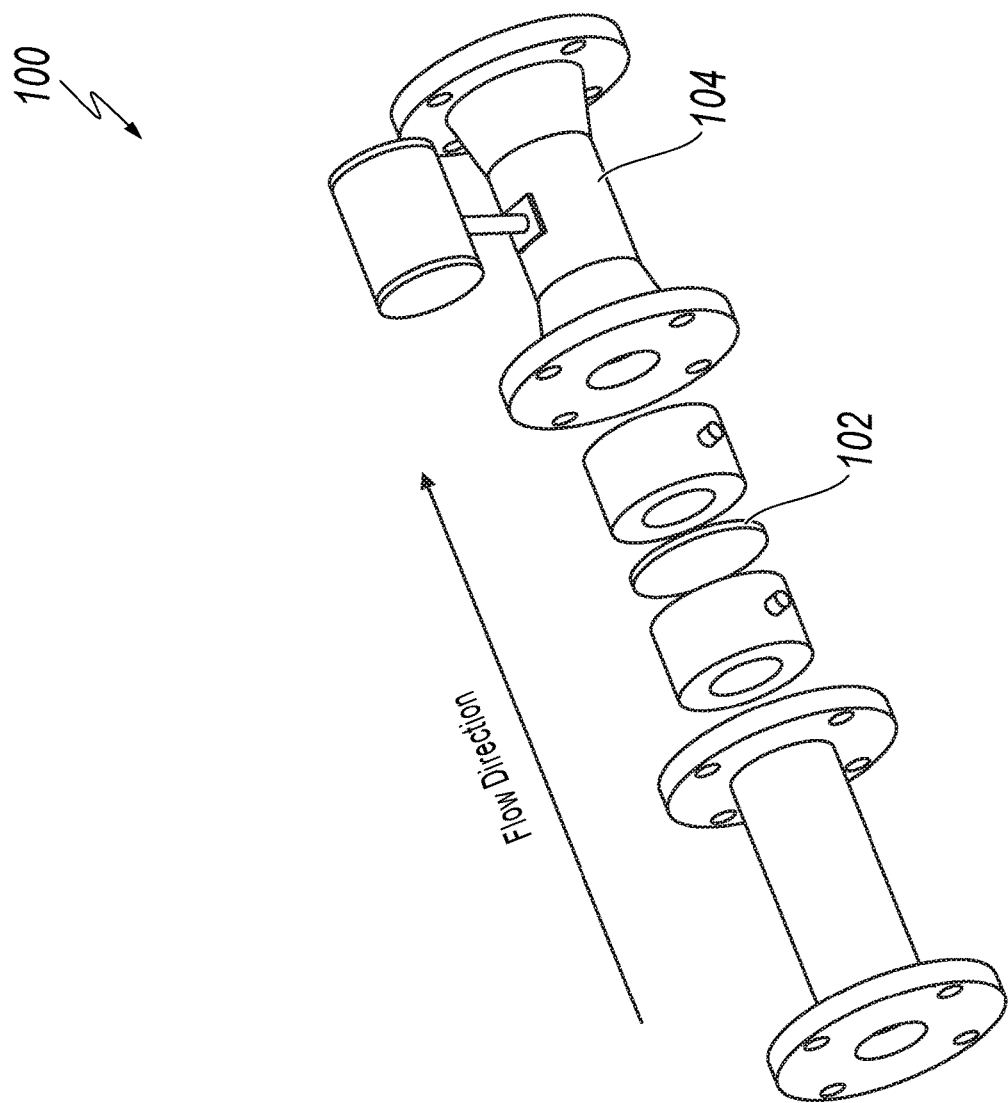
FIG. 1 shows a previously developed multiphase flow meter.
Figure 1:
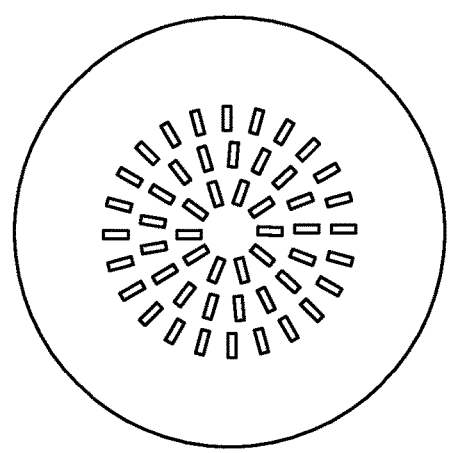

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Conventional solutions for multiphase metering systems require expensive and cumbersome test separators, with associated high maintenance, and field personnel intervention. A common method involves using nuclear material to determine the holdups of the three phases. These measurements can then be coupled with velocity measurements to yield the required phase flow rates. Problems involved with this technique include shielding, source decay, averaging over the cross section, fundamental statistical inaccuracies, limitations in detection equipment, effects of changing water salinity, and problems associated with operating sophisticated electronics in subsea applications. Another method includes using various sensors to measure phase velocities and Gas Volume Fractions (GVF). Accuracy of these sensors is around 5 to 10%. This approach eliminates the need for a nuclear-based element in a multiphase flow meter. However, the need to couple different sensors and flow meters together with pressure drop due to specific design of flow meters makes it more difficult to convince users to employ this approach. Various embodiments utilize fluid mechanics principles and dimensional analysis to correlate the change in pressure drop across a conventional type flow meter with a design modified to withstand multiphase flow, the change in signal/pulses due to change in flow rates, and GVF. A flow meter design which can withstand multiphase environments is disclosed herein. The flow meter has a design generally similar to conventional turbine or swirl flow meters, but in addition to measuring the inline pressures, it can also measure total liquid flow rate and gas volume fraction.

In some embodiments, the present disclosure relates generally to a design of a flow meter similar to a single-phase flow meter, but using proposed algorithms, simple electronics, and robust designs. Furthermore, the flow meter of the present disclosure can also measure the GVF and total flow rate. This makes it very attractive to oil and gas manufacturers, since it is advantageous to estimate the fraction of gas coming from a well, as well as the watercut. In the energy industry (e.g., steam and nuclear power plants), the flow meter of the present disclosure can track the liquid fraction in steam which affects the performance and reliability of energy conversion devices and causes erosion of pipeline. The information from the flow meter of the present disclosure can allow operators make necessary changes in plant control.

In various embodiments, the flow meters of the present disclosure provide for a simple, cheap, and reliable solution. In some embodiments, the flow meters of the present disclosure measure single-phase liquid flow as well as gas content in the flow. In some embodiments, the flow meter of the present disclosure measures single-phase gas flow as well as liquid content in the flow.

Conventional multiphase flow meters use sensors such as Dual-Energy Gamma Densitometry, ultrasonic Doppler sensor, Venturi effect, measurement of dielectric properties, inter alia, which increases cost significantly. The present disclosure relates generally to a novel and parallel approach, where the design of the flow meter, which is generally similar to conventional single-phase flow meter, but more robust, using pressure drops across the flow meter, pressures upstream of the flow meter, and analyzing this data using dimensional analysis proposed for multiphase flow as well as for fluid viscosities. The present disclosure is based on sound fluid mechanics principles which make the flow meters of the present disclosure even more interesting since different sensors to measure the phase velocities and GVFs are not used. In some embodiments, just an output from a single-phase flow meter modified to withstand multiphase flow and pressure data is utilized. Further proposed herein, is the use of turbines and pumps as flow-metering devices. The present disclosure relates generally to new designs of pumps and turbines proposed to measure the multiphase flow properties. Energy conversion by turbines can be used to power a control box and other auxiliary and necessary devices, while the pump can be used to boost the pressure head as well as to measure the flow rate.

Aspects of the present disclosure provide for different types and sizes of flow meters to be manufactured to suit specific applications, for example, but not limited to, swirl/turbine flow meter mass production to measure liquid holdup and GVF for the oil and gas industry, mass production of swirl/turbine flow meters to be used to measure steam flow rate as well as a liquid content, wet gas flow meters in the oil and gas industry, among others. Further embodiments allow for detailed design and fabrication of sample flow meters to validate specific claims, for example, but not limited to, air/water phases, gas/oil phases, among others.

Reference will now be made to more specific embodiments of the present disclosure and data that provides support for such embodiments. However, it should be noted that the disclosure below is for illustrative purposes only and is not intended to limit the scope of the claimed subject matter in any way.

Multiphase Flow Meter Technologies

Basically, two approaches exist to measure the multiphase flow. In the first approach, parameters of the flow are measured that are functions of the three flow rates. For example, a pressure drop across a venturi, the attenuation of a gamma beam, and the impedance of the mixture can be determined and relationships established between these measurements and the flow rates of the respective phases, three independent measurements are required to establish the three flow rates. These relationships cannot be predicted theoretically; therefore, they must be established by calibration. Unfortunately, it usually is not possible to calibrate the full range of conditions over which the measurement technology is to be applied, and this approach is not always a productive one.

The second approach involves measuring the basic parameters of phase velocities and phase cross-sectional fractions (holdups) or quantities that can be unequivocally related to these. To measure the volume flows (and hence the mass flows) of oil, water, and gas in a pipe, three mean velocities and three phase cross sections must be established. Therefore, five measurements are required (three velocities and two-phase fractions—the third phase fraction is obtained by difference between unity and the sum of the two measured ones). Separation or homogenization can reduce this measurement requirement. By separating the phases, the need for cross-sectional holdup measurements disappears, and the three volume flows can be established by conventional single-phase metering technology. However, separation is expensive and difficult to achieve in many cases. The measurement requirement can also be reduced to three if the velocities are equalized by homogenizing the mixture. This method is a much more economic option. However, the range over which satisfactory homogenization can be achieved is limited (e.g., it is less feasible at very high gas fractions).

Dual-Energy Gamma Densitometry

This method uses a gamma source (or sources) with different energies. It is possible to determine the holdups of the three phases, and these measurements can be coupled with velocity measurements to yield the required phase flow rates. Problems involved with this technique include shielding, source decay, averaging over the cross section, fundamental statistical inaccuracies, limitations in detection equipment, effects of changing water salinity, and problems associated with operating sophisticated electronics for subsea applications.

Differential Pressure

These devises are commonly used in single-phase and multiphase flow measurements. The device most commonly used for multiphase flows is the Venturi, but other devices such as orifices or chokes are sometimes used. Generally, the response of such devices for multiphase flows depends on upstream flow conditions. The effective liquid viscosity depends on the continuous phase, the dispersed-phase fraction, and the degree to which they are mixed. An increased flow viscosity increases the differential pressure through the meter and may affect calculation of the flow velocity. There are no general relationships for differential pressure across Venturis and other devices in multiphase flow. In various embodiments, it is desirable to attempt to get as close as possible to a homogeneous flow.

FIG. 1 is a schematic diagram of a previously developed multi-phase flow meter 100. Research was mainly focused on coupling the slotted orifice plate 102 and swirl flow meter 104 to characterize the multiphase flow rate. Due to the well-homogenized flow provided by the slotted plate 102, repeatable GVF measurements with high accuracy are achieved for the range of gas volume fractions. The response of the multiphase flow meter 100 is found to be independent of temperature and liquid flow rate. Another approach was combining multiphase flow meter 100 with an impedance probe. A multiphase flow meter including an electrical impedance sensor and a slotted orifice plate can measure the GVF and total mass flow rate of a two-phase air/water flow. The flow's GVF is obtained from the electrical impedance probe which is then used by the slotted orifice plate 102 to measure the mixture mass flow rate provided the density of the gas and liquid are known. This eliminates the need for a nuclear-based element in a multiphase flow meter. However, the need to couple different sensors and flow meters together with pressure drop due to the slotted plate 102 makes it harder to convince users to employ this approach.

Proposed Concept

A flow meter according to aspects of the disclosure is one which can measure the liquid, gas, or multiphase flow involving three phases such as water, oil, and gas with equivalent accuracy without employing a nuclear-based element or multiple sensors requiring complex calibration and increased cost. In other words, a flow meter used for single-phase flow should be able to measure the multiphase flow. The present disclosure describes, in detail herein, the flow phase behavior as the flow rate, phase quality, and GVF changes, and tracking that behavior using standard fluid mechanics laws based on conservation of mass, momentum, and energy. For example, the volumetric flow through a turbine meter is proportional to the number of pulses per unit. If the viscosity changes corrected flow rate can be calculated by using a revised K factor, and/or if a gas phase is present in the liquid flow, the total flow rate will change which will change the number of pulses; however, the pressure drop across the flow meter will also change which will correspond to the fluid properties and the total flow rate.

Turbine as a Flow Meter and Power Generation Unit

Dimensional analysis is a simple yet powerful tool to characterize the performance of rotating machinery under single-phase flow conditions. The affinity laws were derived using this analysis that reduces the complex performance map into distinct dimensionless curves for useful output parameters. Two curves ($\Psi$ vs $\Phi$ and $\eta$ vs $\Phi$) define the entire performance map of the turbine for a fluid since the fourth non-dimensional group can be calculated from the other three, i.e., $\Pi=f((\Phi, \Psi, \eta)$. If the properties of fluid remains close to the value of the fluid used in the experimental test to obtain the data for the flow map, it is a good representation of the compressor/turbine performance. For a gas turbine:

$$\text{Flow Coefficient: } \Phi = \frac{Q}{\omega D_s^3} \quad (1)$$

$$\text{Head Coefficient: } \Psi = \frac{\frac{n}{(1-n)} p_{inlet}\left[\left(\frac{p_{outlet}}{p_{inlet}}\right)^{\frac{n-1}{n}} - 1\right]}{\rho D_s^3 \omega^2} \quad (2)$$

$$\text{Torque Coefficient: } \Gamma = \frac{T}{\rho \omega^2 D_z^5} \quad (3)$$

$$\text{Power Coefficient: } \Pi = \frac{\omega T}{\rho \omega^3 D_z^5} \quad (4)$$

This is true for single-phase flow. Standard affinity laws are not applicable to the multiphase flow. Significant research has been focused on evaluating the energy loss in pipe flow. Moody's chart is classical example of this analysis, where a rational relationship exists for the laminar flow regime where the friction factor is characterized using one formula based upon the hydraulic Reynolds number. If the energy loss across the pipe can be characterized in the term of length, diameter, fluids properties, and roughness, the same principal can be applied to pumps and turbines since the energy loss is also based on their size, types and fluid properties. The present disclosure seeks to identify the factors that are dominant in the performance characterization and how these factors can be utilized to develop the correlation. Described in detail herein is the variation in the flow velocity as a function of specific pump/turbine type, operational conditions, such as, for example, rotational speed and fluid properties, and how can they be combined to characterize the performance. In the case of impulse turbine, the energy conversion occurs across nozzles and jet momentum is transferred to the blades. The presence of liquid droplets in steam or air degrades the momentum which will affect the performance as seen before. Change in the flow regime as a function of liquid content can have a scalable effect on the turbine performance. The dimensional parameters including the rotational Reynolds number defined for two-phase flow are presented below.

Flow Coefficient for two-phase flow: $\Phi_{mix} = \dfrac{Q_{mix}}{\omega D_s^3}$ (5)

Head Coefficient for two-phase flow: $\Psi_{mix} =$ (6)

$$\dfrac{\dfrac{n}{(1-n)} p_{inlet} \left[ \left( \dfrac{p_{outlet}}{p_{inlet}} \right)^{\frac{n-1}{n}} - 1 \right]}{\rho_{mix} D_s^2 \omega^2}$$

Output Power Coefficient for two phase flow: $\Pi_{mix,out} = \dfrac{\omega\, T}{\rho_{mix} \omega^3 D_z^5}$ (7)

Input Power Coefficient for two phase flow: $\Pi_{mix,in} = \dfrac{\Psi_{mix} \cdot \Phi_{mix}}{\rho_{mix} \omega^3 D_z^5}$ (8)

Rotational Reynolds Number, $Re_{w,mix} = \dfrac{\rho_{mix} \omega D_s^2}{\mu_{mix}}$ (9)

For the two-phase flow, the fluid properties are different from single-phase flow. $Q_{mix}$ total volumetric flow rate. The density and the viscosity of the mixture are the weighted averages of liquid and gas, $\rho_{mix} = \alpha \rho_g + (1-\alpha)\rho_l$ and $\mu_{mix} \alpha \mu_g + (1-\alpha)\mu_l$.

Proposed Algorithm and New Design of Flow Meter to Predict Multiphase Flow

FIG. 2A is a front view of a flow meter 200. FIG. 2B is a cross-sectional view of the flow meter 200. Referring to FIGS. 2A-2B, the flow meter 200 includes a tubular housing 202. A set of upstream bearing supports 204 and a set of downstream bearing supports 206 are disposed within the tubular housing 202. In various embodiments, the upstream bearing support ribs 204 and the downstream bearing support ribs 206 are constructed with an aerodynamic shape. The aerodynamic shape of the upstream bearing support ribs 204 and the downstream bearing support ribs 206 facilitates homogenization of fluid 208 flown through the flow meter 200. An upstream bearing 210 is disposed in the upstream bearing support ribs 204 and a downstream bearing 212 is disposed in the downstream bearing support ribs 206. A rotor shaft 214 is coupled to the upstream bearing 210 and the downstream bearing 212 and extends between the upstream bearing support ribs 204 and the downstream bearing support ribs 206.

Still referring to FIG. 2, a rotor 216 is coupled to the rotor shaft 214. The rotor 216 includes a plurality of rotor blades 218 that extend radially outward from a rotor hub 220. In various embodiments, the rotor inlet diameter and blades 218 and stator 219 have dimensions sufficient to produce a desired momentum and pressure drop across the flow meter 200. Considering the value of pressure drop ($\Delta p$), rotor hydraulic diameter (d) and overall length (l) of flow meter, the ratio of $\Delta p/(\Pi \cdot d \cdot l)$ for modified flow meter is around 0.25 unit at high end of measurement range. In various embodiments, the incoming fluid impinging on rotor blades 218 induces rotation of the rotor 216 as the fluid 208 moves through the tubular housing 202. Rotational sensors 222 are disposed on an interior wall of the tubular housing 202 on opposite sides of the rotor 216. In various embodiments, the rotational sensors 222 are, for example, inductive sensors such that, as the rotor blades 218 move past the rotational sensors 222 an electrical current or pulse is generated and transmitted to a processor 224. Thus, a higher rate of flow of the fluid 208 results in faster rotation of the rotor 216, which produces more rapid pulses from the rotational sensors 222.

Still referring to FIG. 2, a first pressure sensor 226 is positioned on an upstream side of the rotor 216 and a second pressure sensor 228 is positioned on a downstream side of the rotor 216. In various embodiments, the first pressure sensor 226 and the second pressure sensor 228 may be, for example, venturi-type pressure sensors or any other appropriate type of pressure sensor. During operation, the first pressure sensor measures an inlet fluid pressure ($P_{inlet}$) and transmits a signal corresponding to the inlet fluid pressure to the processor 224. Also, the first pressure sensor 226 and the second pressure sensor 228 together measure a pressure difference ($\Delta P$) across the rotor 216.

Various embodiments correlate the change in multiphase flow to the pulse output. The flow meter 200 can be of any type, such as, for example, turbine, swirl, vortex or Venturi, or anything that causes change in measurement parameters as a function of multiphase flow. For example, in the present disclosure, a turbine flow meter 200 is used. The turbine flow meter 200 for multiphase flow is envisioned to have slightly different design features—same axial flow, with thicker blades, longer length, and higher twist angle is used to induce slightly higher pressure drop for better readings and to withstand the forces due to multiphase flow. In various embodiments, tungsten carbide journal and thrust bearings may be used for multiphase flow with high liquid content while ceramic ball bearings may be used for wet gas application. For single-phase flow, the flow meter will use standard k factor to measure the flow rates which directly correlates the number of pulses with flow rate, however, differential pressure and upstream pressure is also recorded. This represents the baseline data for single-phase flow. With change in viscosity and GVF, the number of pulses, $P_{inlet}$ and $\Delta P$ will change. The present disclosure uses the same method described above to correct the flow rate based on measured parameters.

Figure 3:
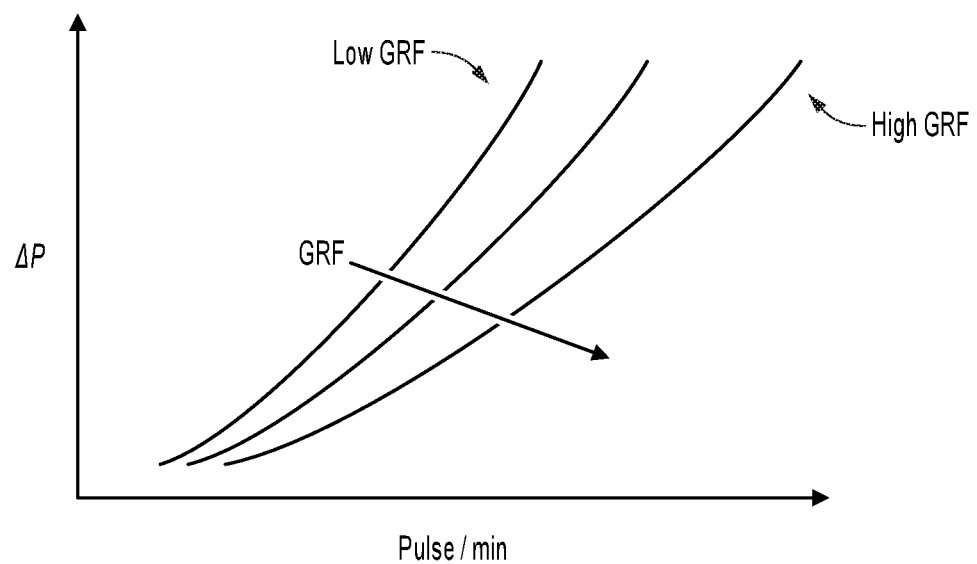
FIG. 3 shows general trends of typical flow meter as a function of different Gas Volume Fractions (GVFs)

FIG. 3 shows the schematic of general performance of turbine flow meter and the pressure drop vs pulse/min for different GVFs. Change in viscosity will have similar effects with increased pressure difference as the viscosity increases.

Effect of viscosity, density, and multiphase flow rates on the number of pulses are evaluated using dimensional analysis as described before. Fluid viscosity and density are known to the operator. In the present disclosure, the pressure difference across the flow meter is known, while GVF and total flow rate in the case of multiphase flow is unknown. This is the opposite of the pump or turbine performance with varying fluid condition.

Flow Coefficient for two phase flow: $\Phi_{mix} = \dfrac{Q_{mix}}{\omega D_z^3}$ (10)

Head Coefficient for two phase flow: $\Psi_{mix} = \dfrac{\Delta P}{\rho_{mix} D_s^2 \omega^2}$ (11)

Rotational Reynolds Number, $Re_{w,mix} = \dfrac{\rho_{mix} \omega D_z^2}{\mu_{mix}}$ (12)

Figure 4:
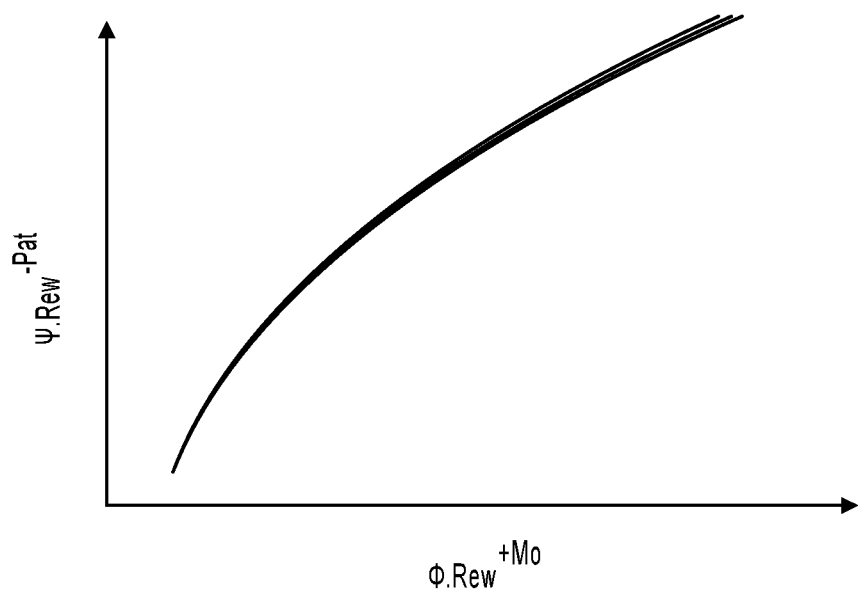
FIG. 4 shows Modified Affinity Law applied to flow meter data.

It was demonstrated using pump and turbine data that all the pressure coefficient and shaft power coefficient data can be collapsed on single line using revised X and Y-Axis as shown in FIG. 4.

The following correlation is used to calculate GVF:

$$\Psi_{gas} \cdot Re_{w,gas}^{-b,gas} = \Psi_{mix} \cdot Re_{w,mix}^{-b,mix} \text{ for air flow meter (wet gas application); and} \quad (13)$$

$$\Psi_{liquid} \cdot Re_{w,liquid}^{-b,liquid} = \Psi_{mix} \cdot Re_{w,mix}^{-b,mix} \text{ for liquid flow meter (low GVF application)} \quad (14)$$

Once the volume fraction is determined, the total flow rate and individual flow rates can be calculated by using following equations:

For air flow meter (wet gas application):

$$X\text{-Axis: } \phi_{gas} \cdot Re_{w,gas}^{-Mo,gas} = \phi_{mix} \cdot Re_{w,mix}^{-Mo,mix} \quad (15)$$

$$Y\text{-Axis: } \Psi_{gas} \cdot Re_{w,gas}^{-Pat,gas} = \Psi_{mix} \cdot Re_{\omega,mix}^{-Pat,mix} \quad (16)$$

For liquid flow meter (low GVF application):

$$X\text{-axis: } \phi_{liquid} \cdot Re_{w,liquid}^{-Mo,liquid} = \phi_{mix} \cdot Re_{w,mix}^{Mo,mix} \quad (17)$$

$$Y\text{-axis: } \Psi_{liquid} \cdot Re_{\omega,liquid}^{-Pat,liquid} = \Psi_{mix} \cdot Re_{\omega,mix}^{-Pat,mix} \quad (18)$$

A signal converter will be used to convert pulse/min or raw data to voltage. Data from $\Delta P$, $P_{inlet}$ will be converted into voltage signal. Digital logic gates will be utilized to process the data and provide output parameters. This system can be designed to be compatible with a Highway Addressable Remote Transducer "HART."

Only one flow meter can be used based on complete characterization of multiphase flow from liquid to gas. This approach is based on sound fluid mechanics principles and should be applicable to any flow meter type. For example, change in pressure drop in venturi flow meter with the multiphase flow can be captured and characterized to calculate GVF and total flow rate.

Another advantage of this method is that knowing the properties of the oil (e.g., viscosity and/or density), the water-cut can be predicted using the proposed model.

A primary function of energy conversion devices is to convert the energy from one form to another. Prediction model developed herein evaluates friction losses as a function of fluid properties and operational conditions in order to predict the performance. If the performance of the device is known, the known losses due to multiphase flow can be used to predict the multiphase flow rates. In short, a pump, compressor, or turbine can be used as flow-metering devices. Furthermore, devices can be manufactured as a pumping or power generation device as well as flow-metering device.

Turbine Flow Meter with Swirl Conditioner and/or Nozzle at the Inlet

Figure 5:
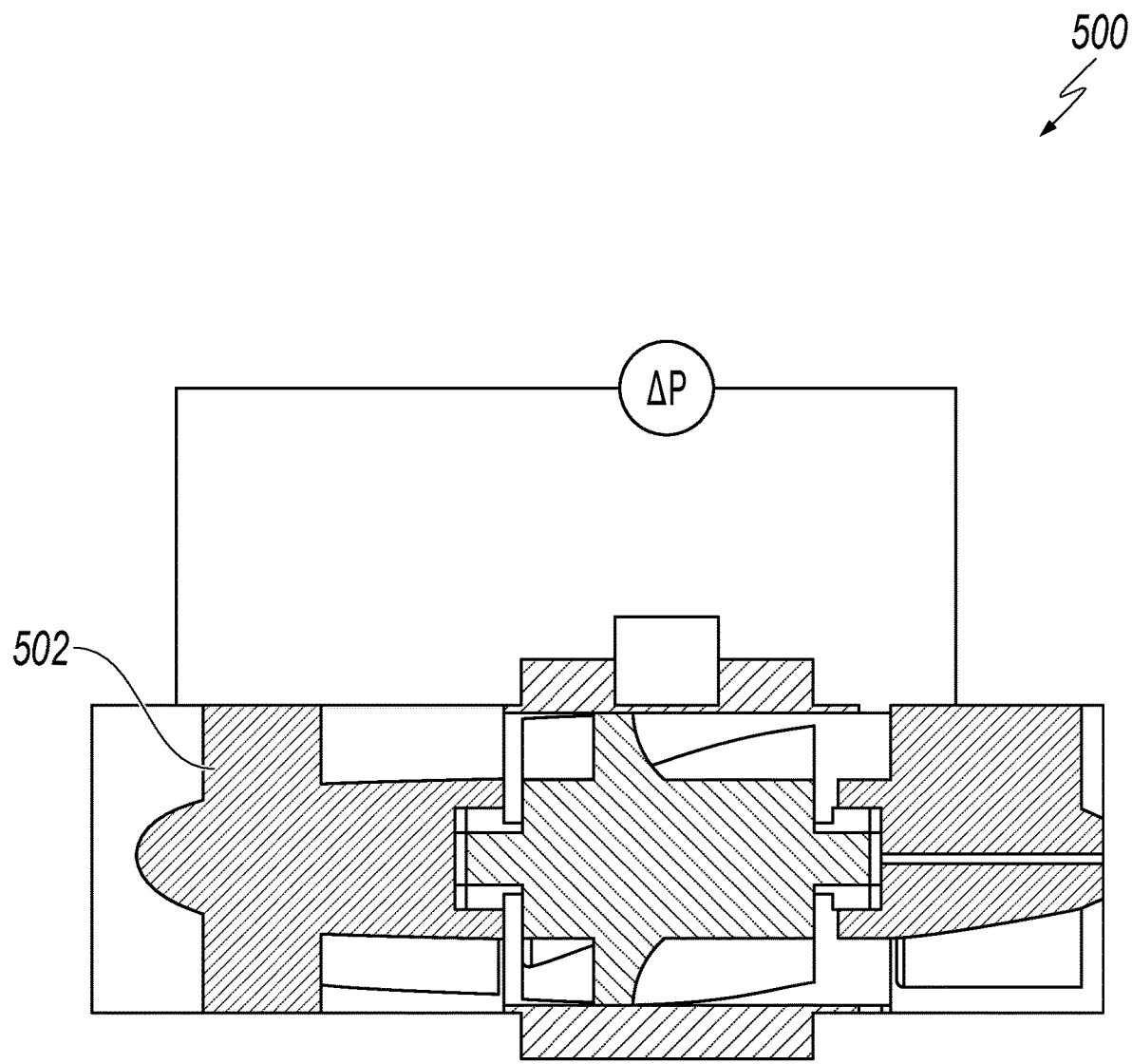
FIG. 5 is a cross sectional view of a flow meter showing nozzle and/or swirl (stator) and/or rotor configuration.

FIG. 5 illustrates a cross-sectional view of a flow meter 500 having a flow conditioning stator device 502. The flow meter 500 modified to change the design of stator that includes multiple static vanes used to direct and condition the flow. In various embodiments, the flow-conditioning stator 502 may be, for example, a gradual flow restriction, a nozzle, or any other variety of flow conditioner. In various embodiments, a turbine flow meter is essentially a turbine with minimal load.

Pump or Compressor as a Flow-Metering Device

Figure 6:
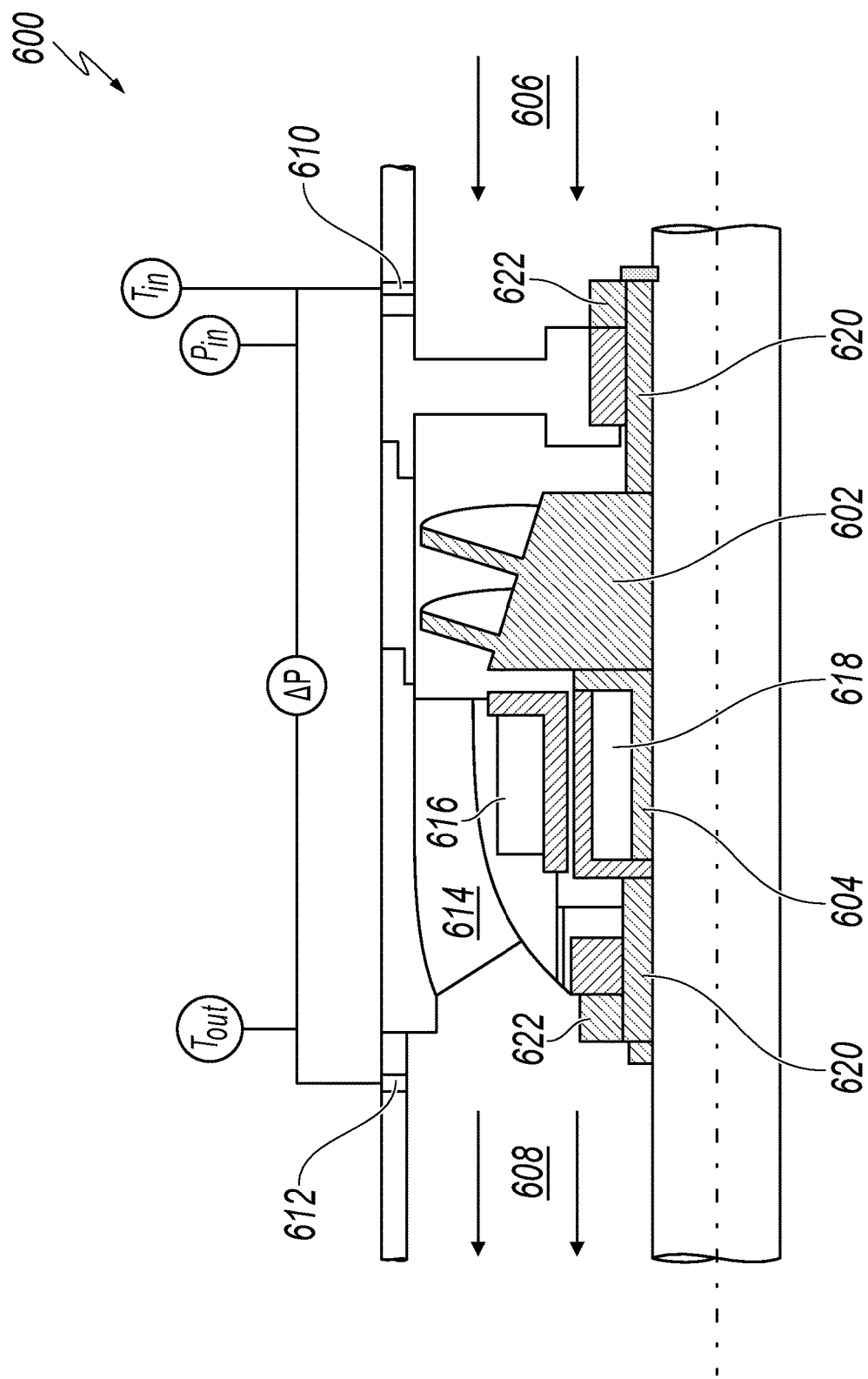
FIG. 6 is a cross-sectional view of a pump as a flow meter according to aspects of the disclosure.
Figure 18A:
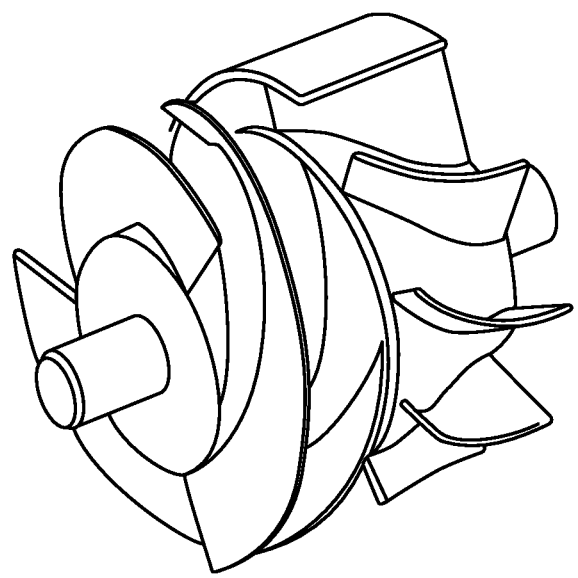
FIG. 18A is a perspective view of a high specific speed helicoaxial pump.
Figure 18B:
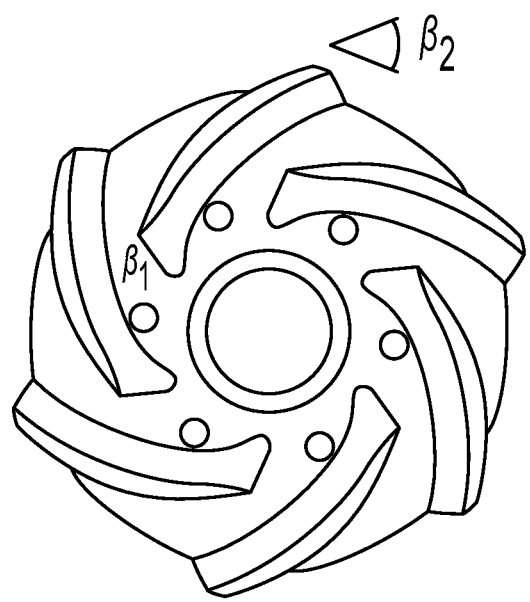
FIG. 18B is a front view of a low-to-medium specific speed mixed flow pump having unitary blades.
Figure 18C:
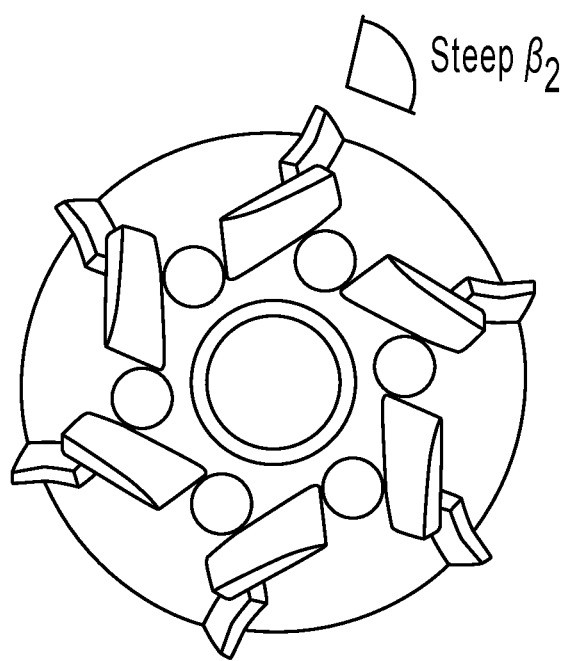
FIG. 18C is a front view of a low-to-medium specific speed mixed flow pump having split blades.
Figure 19A:
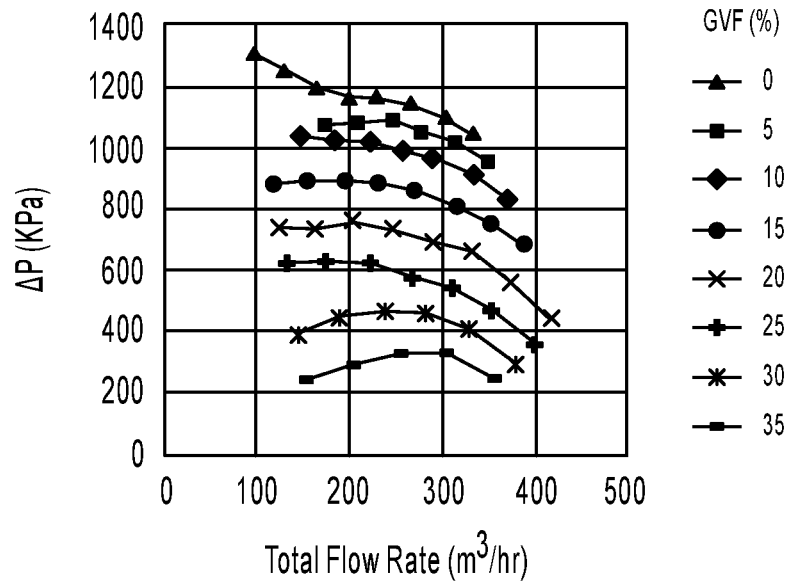
FIG. 19A is a plot head flow rate performance of low specific speed pump.
Figure 19B:
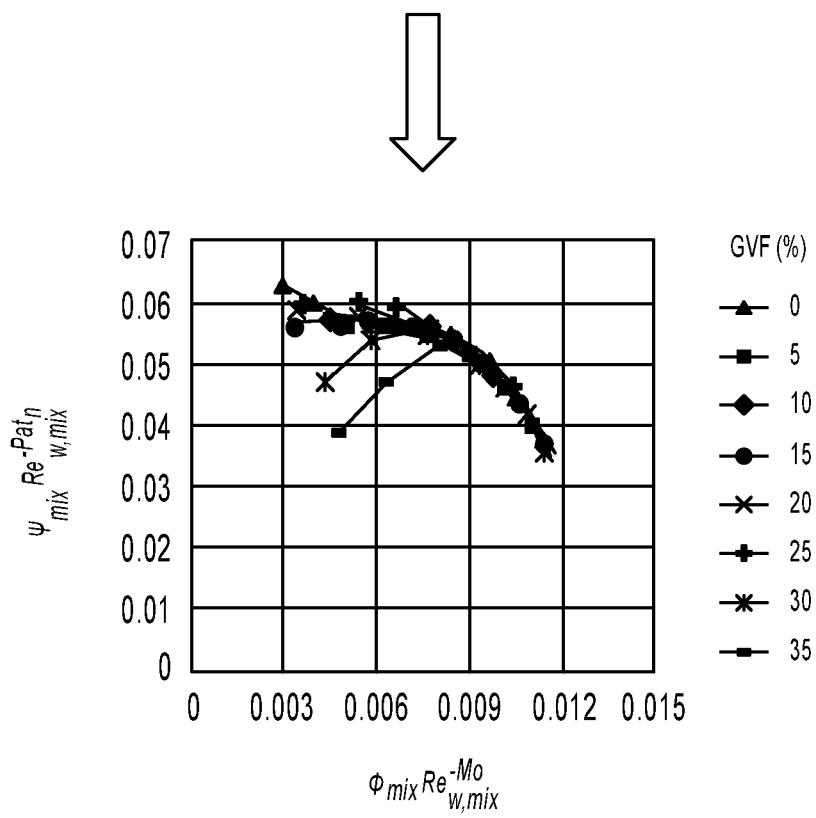
FIG. 19B is a plot of performance in multi-phase flow conditions of a low specific speed pump.
Figure 19C:
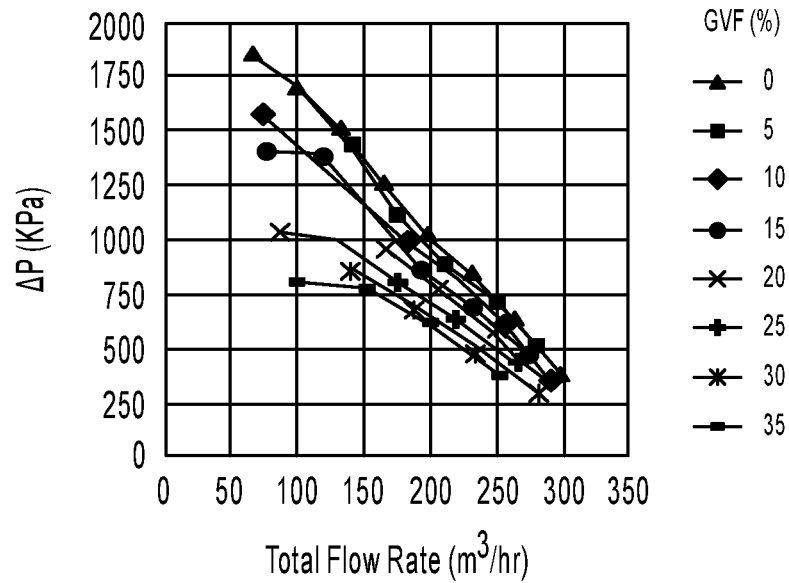
FIG. 19C is a plot head flow rate performance of high specific speed pump.
Figure 19D:
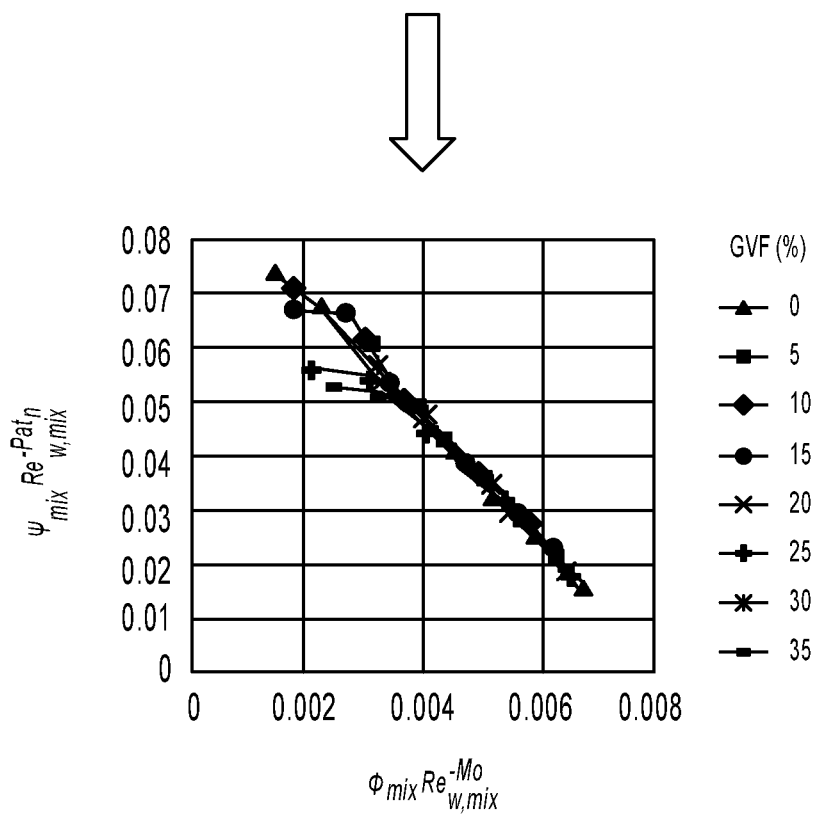
FIG. 19D is a plot of performance in multi-phase flow conditions of a high specific speed pump.

FIG. 6 is a schematic diagram of a flow measurement system 600. The flow measurement system 600 includes a pump 602, which is driven by a motor 604. An inlet pipe 606 feeds fluid to the pump 602 and an outlet pipe 608 directs fluid away from the pump 602. A first pressure sensor 610 is disposed in the inlet pipe 606 and a second pressure sensor 612 is disposed in the outlet pipe 608. Similar to the flow meter 200 discussed above, during operation, the first pressure sensor 610 measures an inlet fluid pressure ($P_{inlet}$) in the inlet pipe 606 and transmits a signal corresponding to the inlet fluid pressure to a processor 614. Also, the first pressure sensor 610 and the second pressure sensor 612 together measure a pressure difference ($\Delta P$) across the rotor of the pump (not explicitly shown). During operation, $P_{inlet}$, $\Delta P$, together with the electrical pulses generated by the pump rotor in a manner similar to that discussed above with respect to the flow meter 200, allows the pump 602 to measure multi-phase fluid flow through the pump 602. Pumps with any specific speed can be installed inline to boost the pressure as well as to predict the change in flow rate or change in multiphase flow. Examples of pumps are shown in FIGS. 18A-18C.

FIGS. 19A-19D illustrate the test results and data presented using proposed model of two pump designs at different operating conditions.

Revised total flow rate including gas phase $$\phi_{liquid} \cdot Re_{\omega,liquid}^{-Mo,liquid} = \phi_{mix} \cdot Re_{\omega,mix}^{-Mo,mix} \quad (19)$$

The change in head as a function of two phase flow $$\Psi_{liquid} \cdot Re_{\omega,liquid}^{-Pat,liquid} = \Psi_{mix} \cdot Re_{\omega,mix}^{-Pat,mix} \quad (20)$$

Figure 20A:
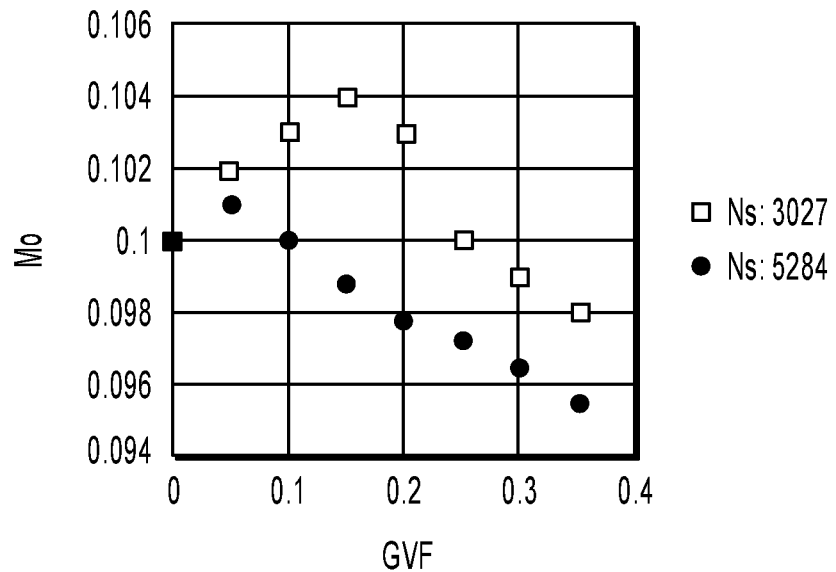
FIG. 20A is a plot of Mo versus gas volume fraction for two pump designs.
Figure 20B:
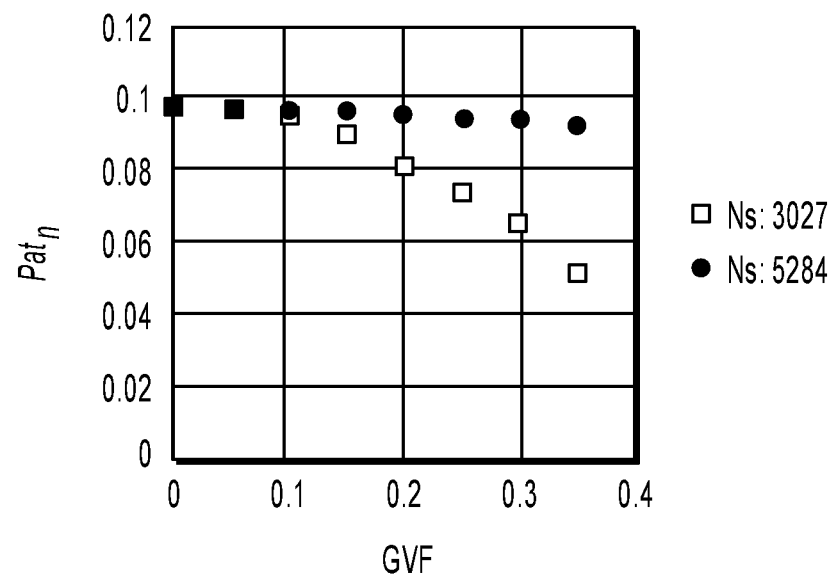
FIG. 20B is a plot of Pat versus gas volume fraction for two pump designs.

FIGS. 20A-20B illustrate the change in independent (Mo) and dependent (Pat) dimensionless number for two pump designs. As seen in figure the change in Pat represents the pump performance degradation. The high specific speed pump has superior performs for high GVF flows. The correlations for Pat and Mo can be presented using suitable equation also along with the graphical representation. Change in power input can also be utilized to calculate the flow composition and vice versa.

In some embodiments, the specific speed is preferably high specific speed due to a higher slope of performance curve and superior performance at high GVFs. In various embodiments, positive displacement pumps such as twin-screw pump designs may be utilized to handle very high gas volume fractions. Knowing the head for specific RPM and valve position, change in head can be used to evaluate the change in multiphase flow. That is GVF and individual flow rates. Also, water cut can be evaluated for two liquid phases.

Referring again to FIG. 6, in various embodiments, the flow measurement system 600 can be configured in a variety of ways to suit the requirements of different applications. For example, an impeller of the pump 602 can be connected to a rotor magnet and a diffuser 614 houses a stator assembly 616 of the motor 604. In various embodiments, the flow measurement system 600 may be designed similar to a canned motor pump where complete isolation of stator and rotor of a motor is achieved from the production fluid. The electrical input connections can be designed using thick diffuser vanes. Motion of the stator 616 may be restricted using, for example, a keyway or notch. A gap between the stator 616 and a rotor 618 can be maintained and the rotor 618 can be supported by using carbide bushings 620 attached on each side of the flow measurement device 600. Thrust bearings 622 are installed to absorb the thrust created by operation of the pump 602. Flow intake and exit is axial in nature. Flanges can be attached on each side for convenient assembly/disassembly. Such an arrangement eliminates the necessity of a mechanical face seal.

The invention relates to the method and a equipment designed to perform basic function of pumping the fluid as well as prediction of multi-components in production fluid.

Turbine as a Flow-Metering Device and Generator

Figure 7:
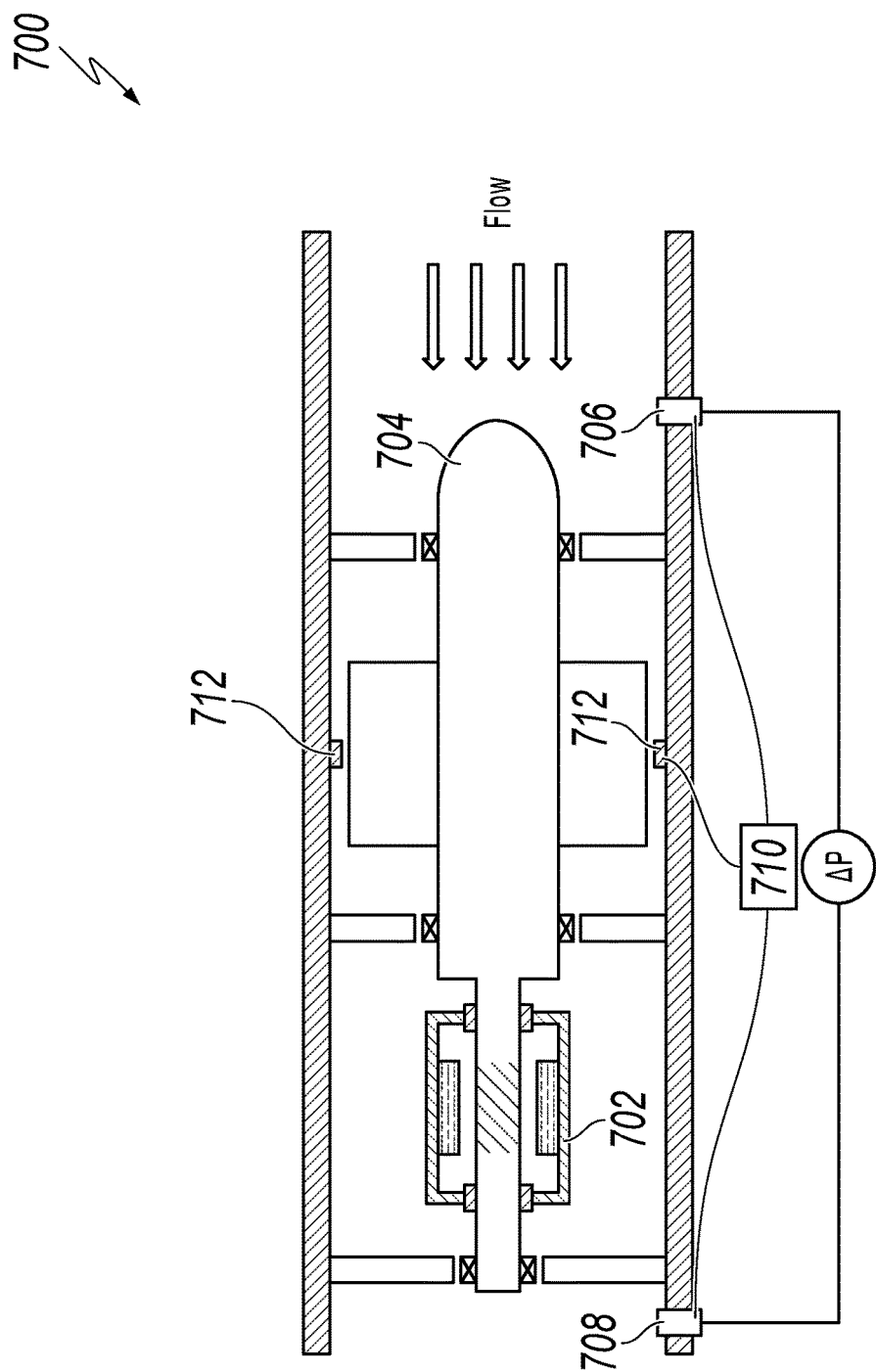
FIG. 7 is a cross-sectional view of an inline turbine as a flow meter according to aspects of the disclosure.

FIG. 7 is a cross-sectional view of a flow measurement system 700 including a generator 702. The generator 702 is coupled to a rotor 704. In various embodiments, a gearbox may be utilized to acquire a desired speed ratio. The rotor 704 arranged similar to the flow meter 200 discussed above with respect to FIG. 2. A first pressure sensor 706 is disposed on the inlet side of the rotor 704 and a second pressure sensor 708 is disposed on the outlet side of the rotor 704. Similar to the flow meter 200 discussed above, during operation, the first pressure sensor 706 measures an inlet fluid pressure ($P_{inlet}$) and transmits a signal corresponding to the inlet fluid pressure to a processor 710. Also, the first pressure sensor 706 and the second pressure sensor 708 together measure a pressure difference ($\Delta P$) across the rotor 704. Rotational speed of the rotor 704 is measured by rotational sensors 712 disposed proximate the rotor. A signal corresponding to rotational speed of the rotor 704 is transmitted to the processor 710 in the form of electrical pulses. During operation, $P_{inlet}$, $\Delta P$, together with the electrical pulses generated by the pump rotor in a manner similar to that discussed above with respect to the flow meter 200, allows facilitates measurement of multi-phase fluid flow through the flow measurement system 700. The rotor 704 is coupled to the generator 702. Thus, rotation of the rotor 704 induces rotation of the generator 702 sufficient to induce an electrical current. The variation in fluid composition will change the output load. In various embodiments, a device pre-calibrated with different loads can provide ouput in the terms of GVF and fluid viscosity. In various embodiments, the electrical current could be utilized to provide power to, for example, the processor 710 and/or the rotational sensors 712. In various embodiments, the generator 702 is a direct-current (DC) generator and includes, for example, permanent magnets.

Figure 8B:
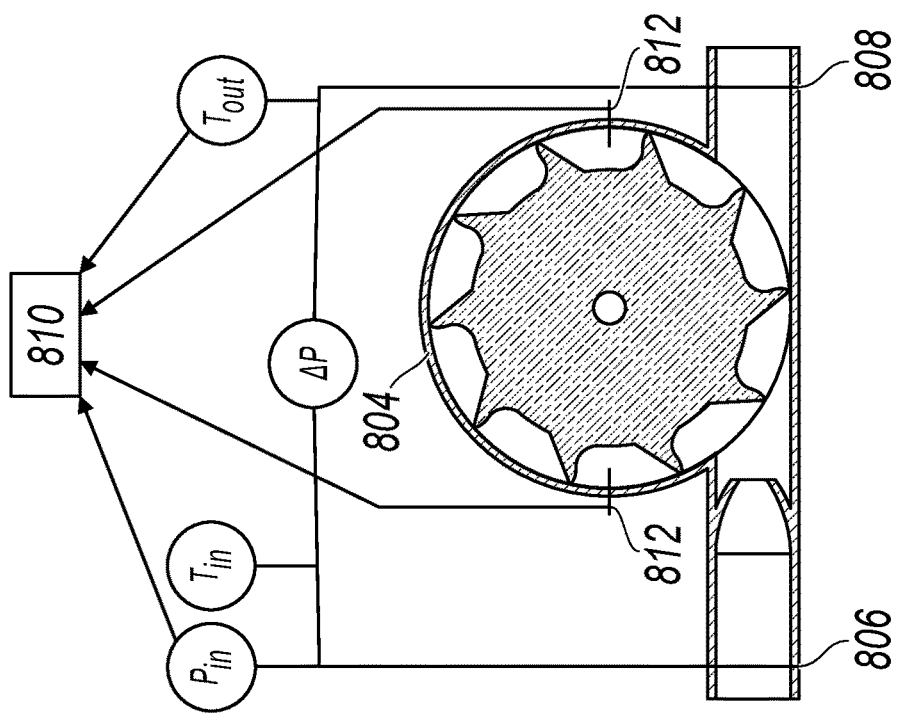
FIG. 8B is a cross-sectional view along line A-A of an impulse turbine as a flow meter according to aspects of the disclosure.
Figure 8A:
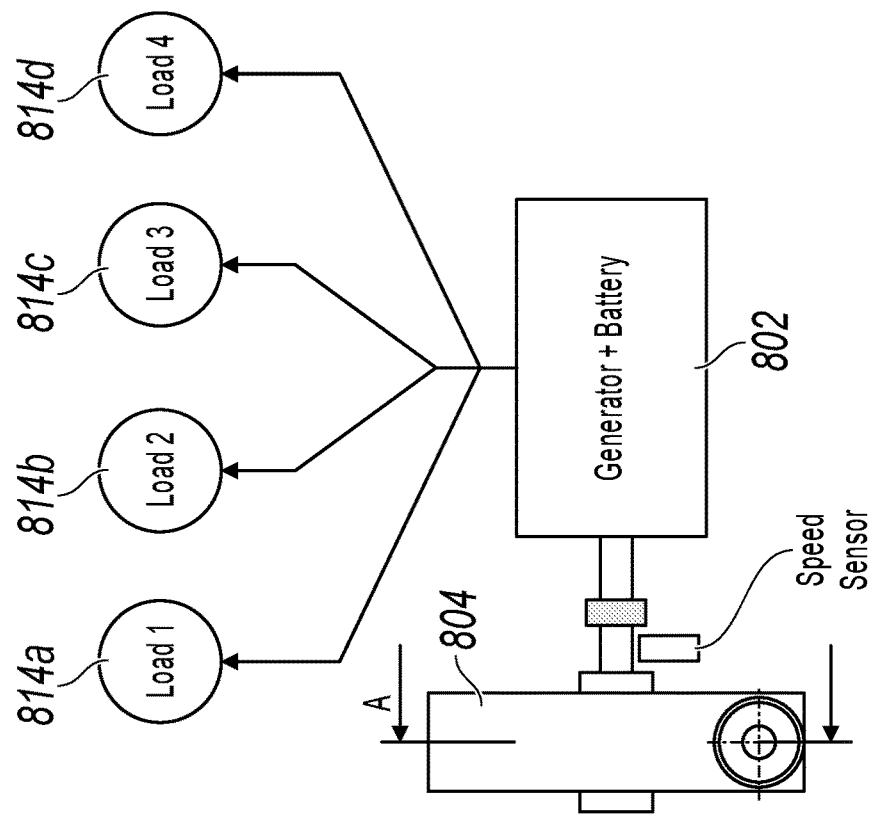
FIG. 8A is a schematic diagram of an impulse turbine utilized as a flow meter according to aspects of the disclosure.

FIG. 8A is a schematic diagram of a flow measurement system 800. FIG. 8B is a cross sectional view of the flow measurement system 800. Referring to FIGS. 8A-8B collectively, the flow measurement system 800 includes a generator 802 and a rotor 804 and operates similar to the flow measurement system 700 discussed above in FIG. 7. In the flow measurement system 800, the generator 802 is positioned outside of the path of fluid flow. This in contrast to the flow measurement system 700 where the generator 702 is positioned in the path of fluid flow. A first pressure sensor 806 is disposed on the inlet side of the rotor 804 and a second pressure sensor 808 is disposed on the outlet side of the rotor 804. Similar to the flow meter 700 discussed above, during operation, the first pressure sensor 806 measures an inlet fluid pressure ($P_{inlet}$) and transmits a signal corresponding to the inlet fluid pressure to a processor 810. Also, the first pressure sensor 806 and the second pressure sensor 808 together measure a pressure difference ($\Delta P$) across the rotor 804. Rotational speed of the rotor 804 is measured by rotational sensors 812 disposed proximate the rotor. A signal corresponding to rotational speed of the rotor 804 is transmitted to the processor 810 in the form of electrical pulses. During operation, $P_{inlet}$, $\Delta P$, together with the electrical pulses generated by the pump rotor in a manner similar to that discussed above with respect to the flow meter 700, allows facilitates measurement of multi-phase fluid flow through the flow measurement system 800. The rotor 804 is coupled to the generator 802. Thus, rotation of the rotor 704 induces rotation of the generator 802 sufficient to induce an electrical current. In various embodiments, the electrical current could be utilized to provide power to, for example, loads 814a-814d.

Referring to FIGS. 7 and 8, multiphase flow measurement in remote locations can be a challenging task due to energy availability. Most of the time solar panels are utilized to supply required electrical power to control unit inline axial turbine with a generator housed in the bearing housing as shown in FIG. 7, or simple terry turbine configuration with generator outside the line, as shown in FIGS. 8A-8B. The load on the generator (702, 802) could be varied by shifting the RPM and/or pressure drop across the rotor (704, 804) allowing multiple measurement points. That is, select 4 to 10 power loads, measure RPM and $\Delta P$, then find the density and possibly viscosity that meet all 4 to 10 readings using the modified affinity laws. The power load can be used to operate the meter and auxiliary equipment by keeping a battery charged as the power output of the flow meter varies with the 4 to 10 power load settings required to make the flow measurement. In various embodiments, the turbine design can be configured in a variety of ways including, for example, wheel diameter, material, blade height and angle, nozzle size and design, etc. to meet specific requirements.

Head and Input Power Coefficient

Figure 9:
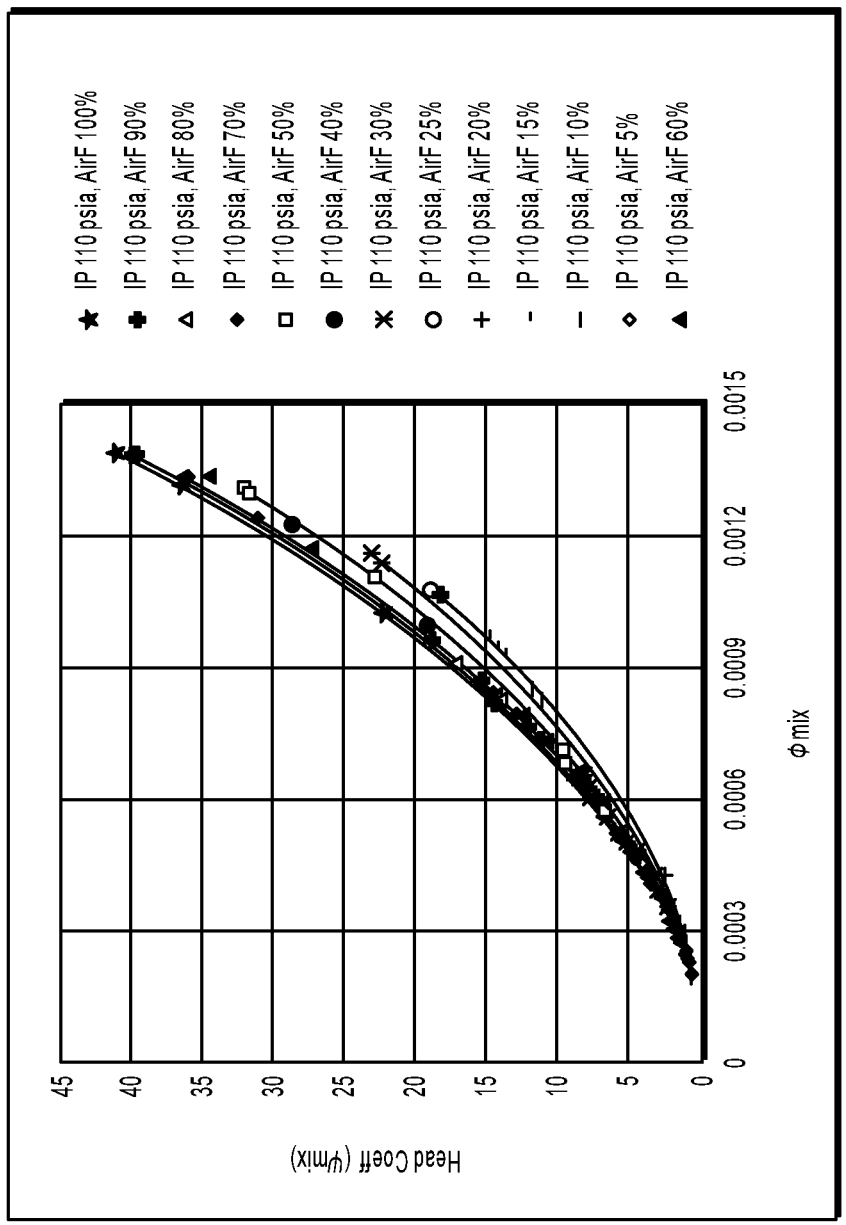
FIG. 9 shows head coefficient ($\Psi_{mix}$) to represent pressure difference across a turbine as a function of different air mass fractions for 110 psia.

Knowing the head coefficient, the power input coefficient can be calculated for given flow coefficient for a specific fraction of liquid [$\Pi_{input} \rightarrow f(\phi, \Psi)$] FIG. 9 shows the head coefficients for 110 psia inlet pressures for varying air fractions. The effect of liquid presence on the performance is evident with head coefficient degrading as the air fraction reduces. The scatter reduced with increased inlet pressure indicating reduced momentum loss.

Figure 10:
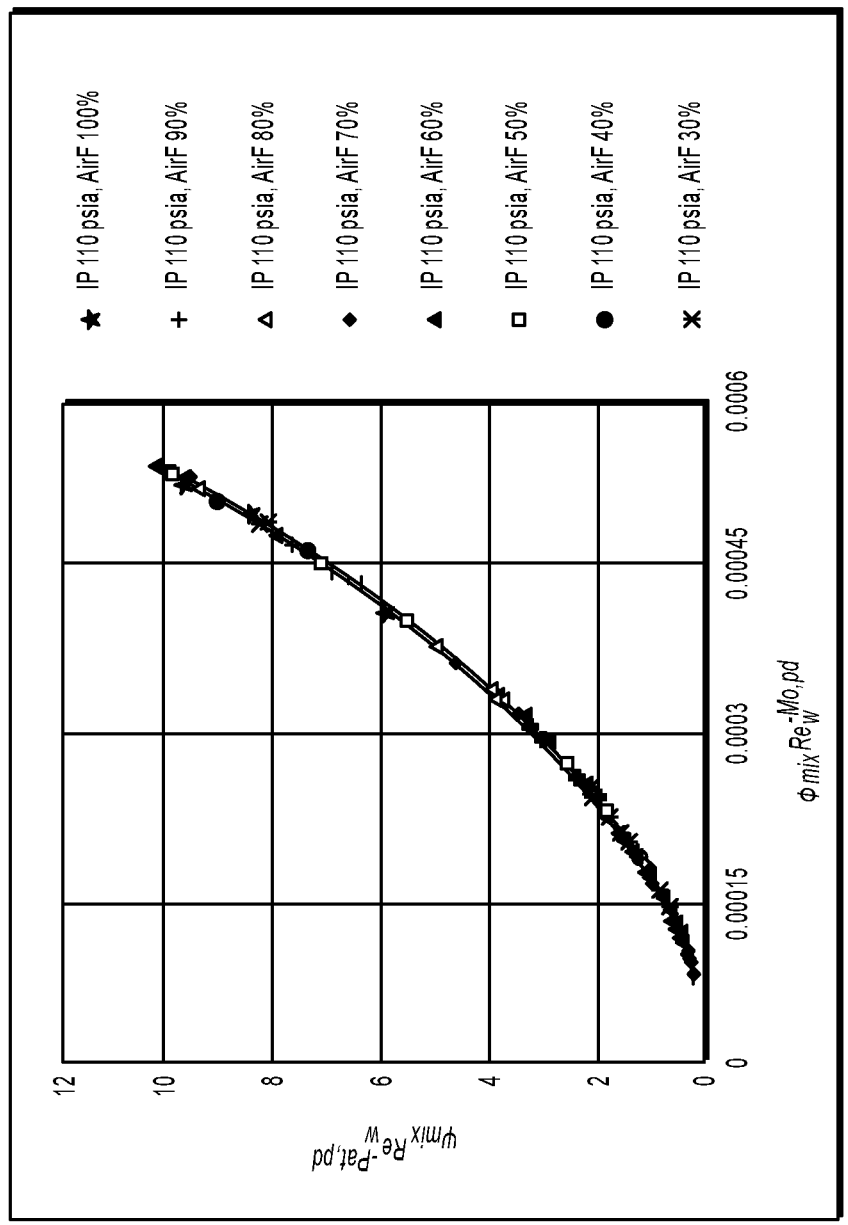
FIG. 10 shows plots of $\Psi_{mix} Re_w^{-Pat,pd}$ against new X-axis, $\phi \cdot Re_w^{-Mo}$ where pd refers to pressure difference.

Empirical models have been established to modify the affinity laws to include the effect of viscosity. The pump head loss as a function of viscous loss is characterized in the term of a dimensionless quantity, the Morrison number, the value of which varies with the pump specific speed and the flow regime. The present disclosure utilizes a similar concept to evaluate the turbine performance degradation as a function of liquid presence in the gas (e.g., air). Two dimensionless number groups are proposed to correct X and Y axis data as shown in FIG. 10. The Mo, which represents fluid friction losses due to fluid properties including multi-phase flow interaction, operational conditions, and design parameters. Pat represents the change in dependent parameters such as pressure difference and turbine power output. In the case of the terry turbine, considering the velocity triangle at the turbine blade, the velocity of the fluid impinging on the blade depends upon the flow rate while rotational Reynolds number represents the combined effect of inertial forces due to rotational speed and the friction force due to the fluid properties. Thus for the turbine analysis, the fluid friction effects are considered a function of the flow through the nozzle which is represented by the flow coefficient and the rotational speed which is represented by the rotational Reynolds number. These two non-dimensional groups are combined to represent the effects of two-phase flow. The X-axis formed by the flow coefficient multiplied by the Rew raised to a power (Mo). The Y-axis formed by the head coefficient multiplied by the Rew raised to a power (Pat). This arrangement resulted in a collapse of the all the data onto a single 2D curve, as shown in the FIG. 11, for varying values of the Mo and Pat.

Figure 11:
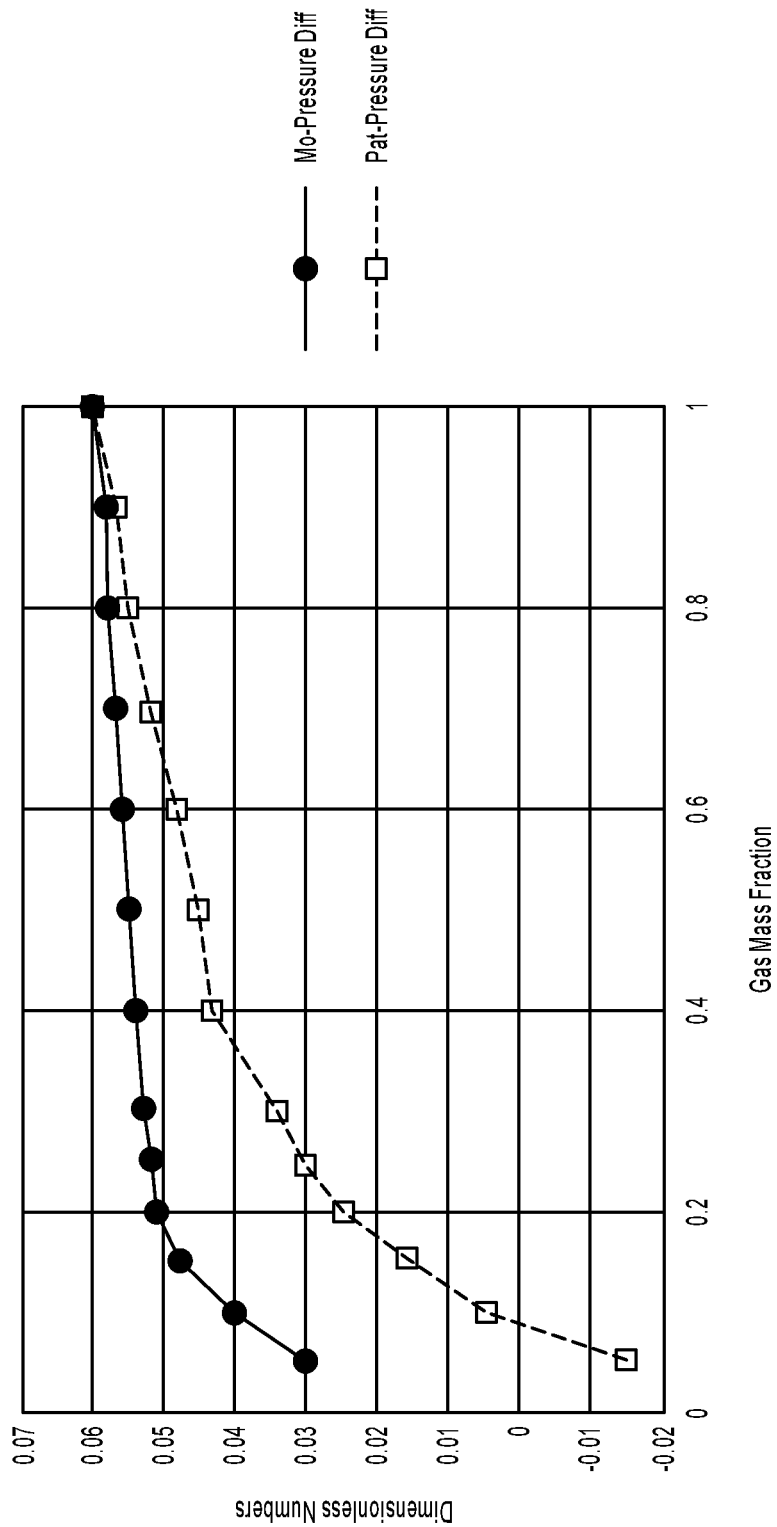
FIG. 11 shows Morrison number and Pat as a function of air mass fraction and inlet pressure.
Figure 12:
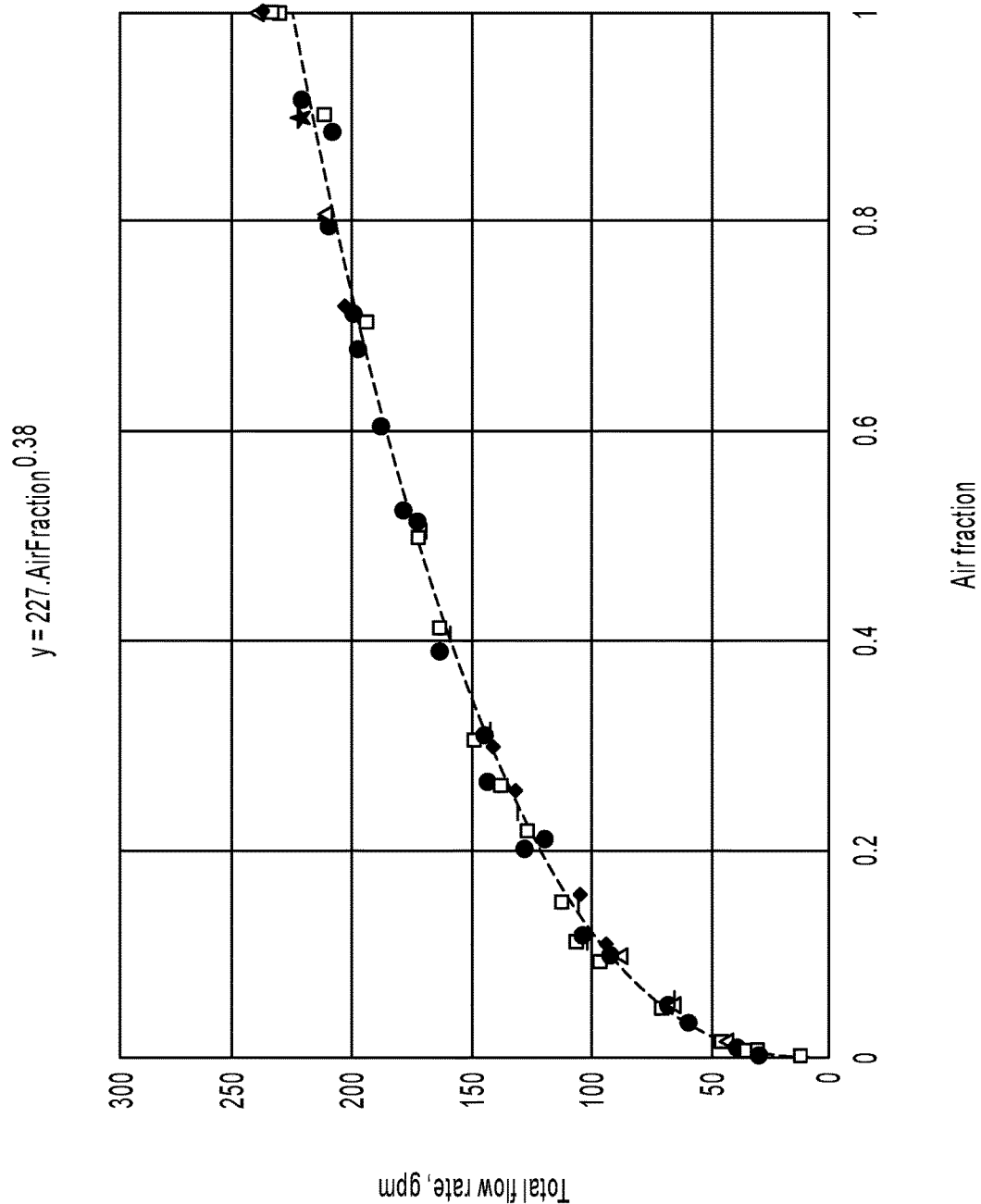
FIG. 12 shows change in total flow rate as a function of air mass fraction at the turbine inlet.
Figure 13:
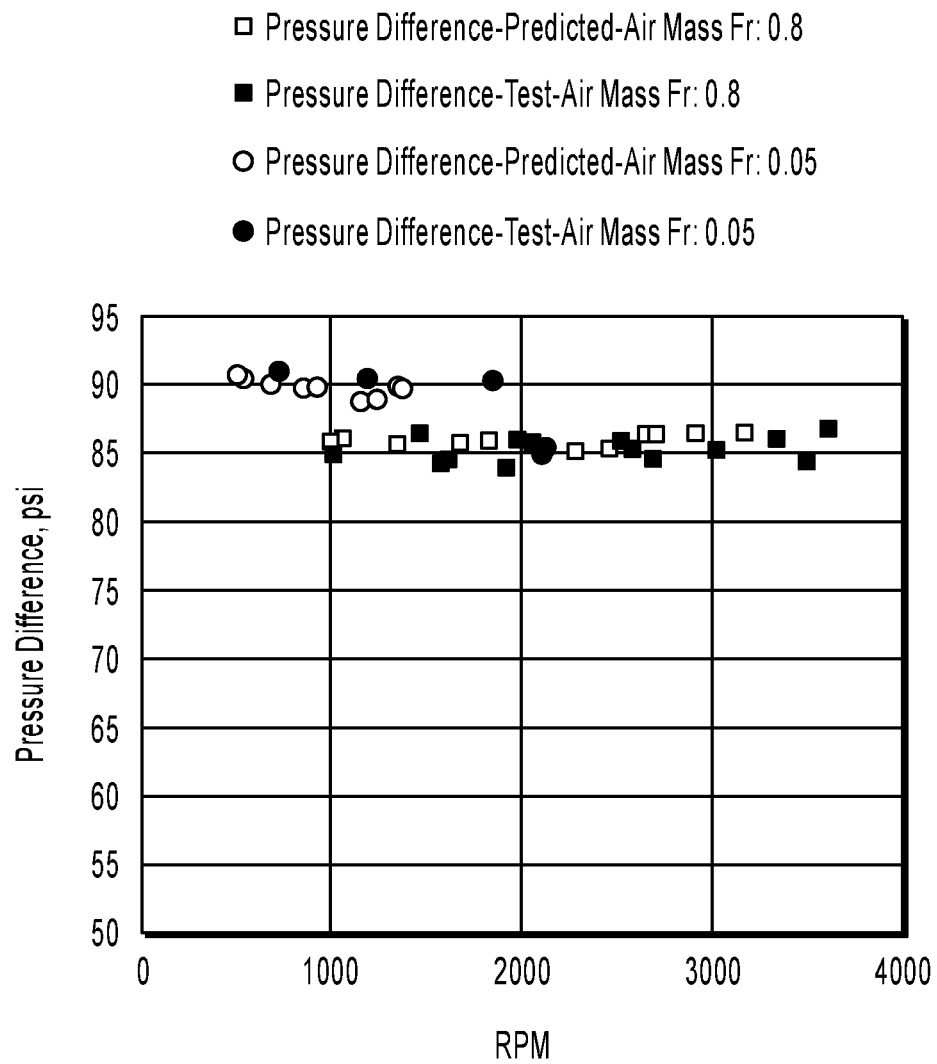
FIG. 13 shows pressure difference test data vs predictions.
Figure 16:
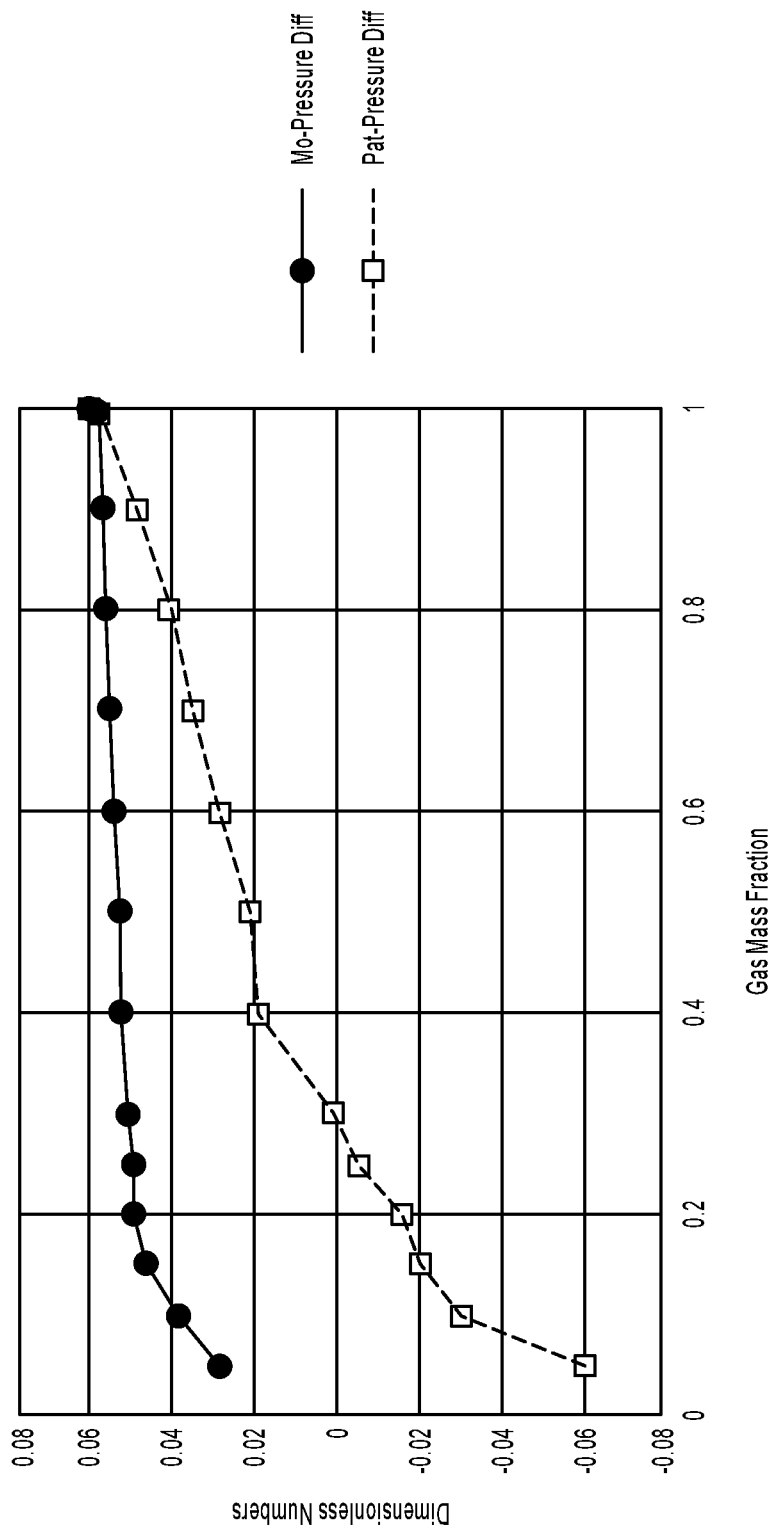
FIG. 16 shows Mo and Pat as a function of air mass fraction and inlet pressure for power output.
Figure 17A:
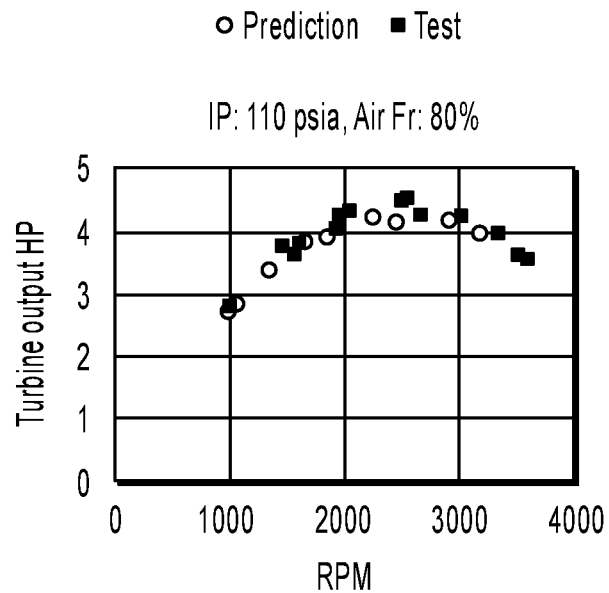
FIGS. 17A-D show turbine output, test data vs predictions.
Figure 17B:
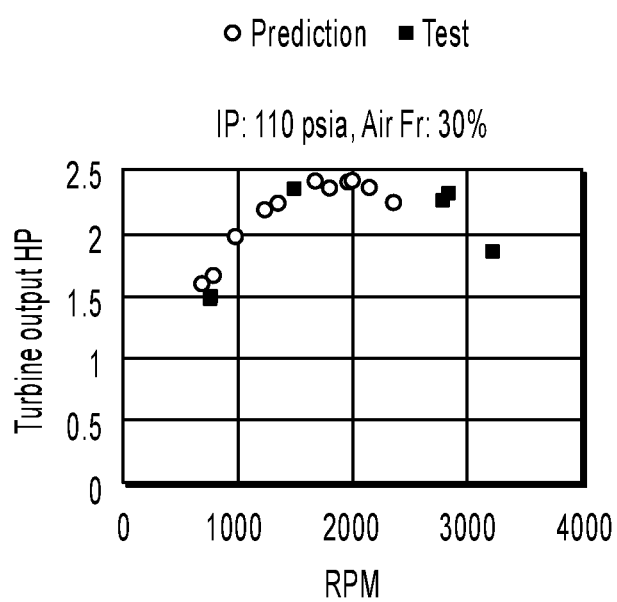
Figure 17C:
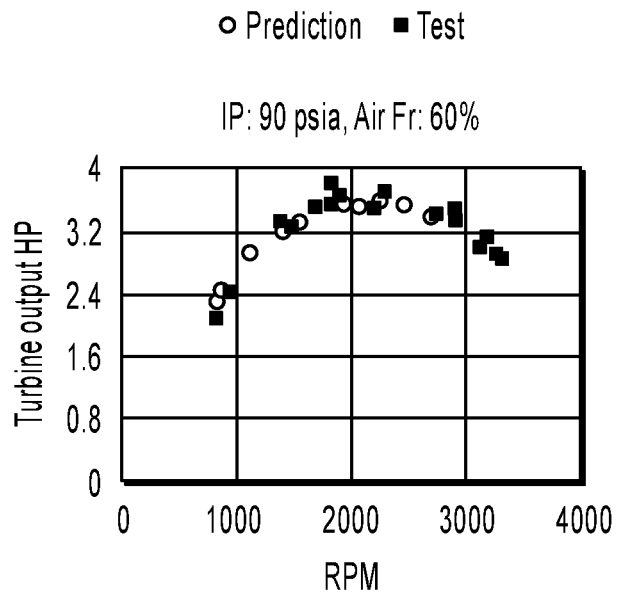
Figure 17D:
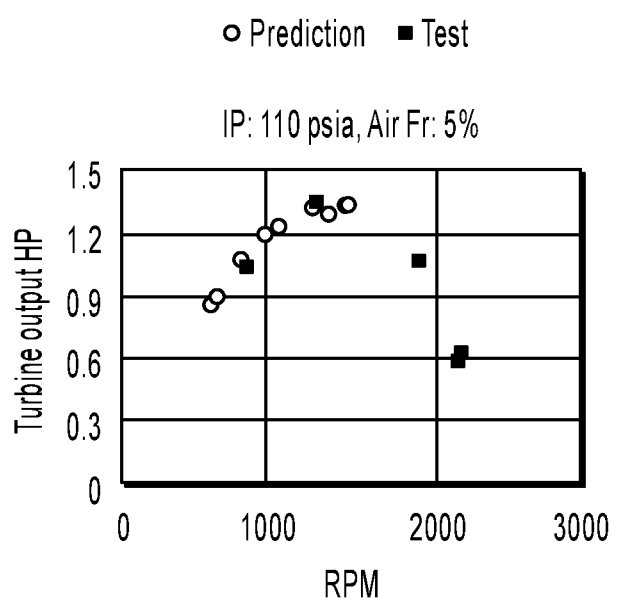

Mo represents the decreased fluid momentum due to moisture content. Pat represents degradation in head or power output due to increased liquid content. The values of the Mo and Pat were evaluated for different inlet pressures and air mass fraction to understand the variation as a function of increased power input. This Pat and Mo values monotonically decreases as a function of air mass fraction. See FIG. 11 and FIG. 16 illustrating Mo and Pat as a function of air mass fraction and pressure and FIG. 12 illustrating change in total flow rate as a function of air mass fraction at the turbine inlet. Mo and Pat values are characteristics of specific design similar to the K-factor for single phase flow.

A relationship to account for varying RPM is developed and is calculated using the newly formulated equation:

$$\phi_{air} \cdot Re_{w,air}^{-Mo,air} = \phi_{mix} \cdot Re_{w,mix}^{-Mo,mix} \quad (21)$$

Figure 14:
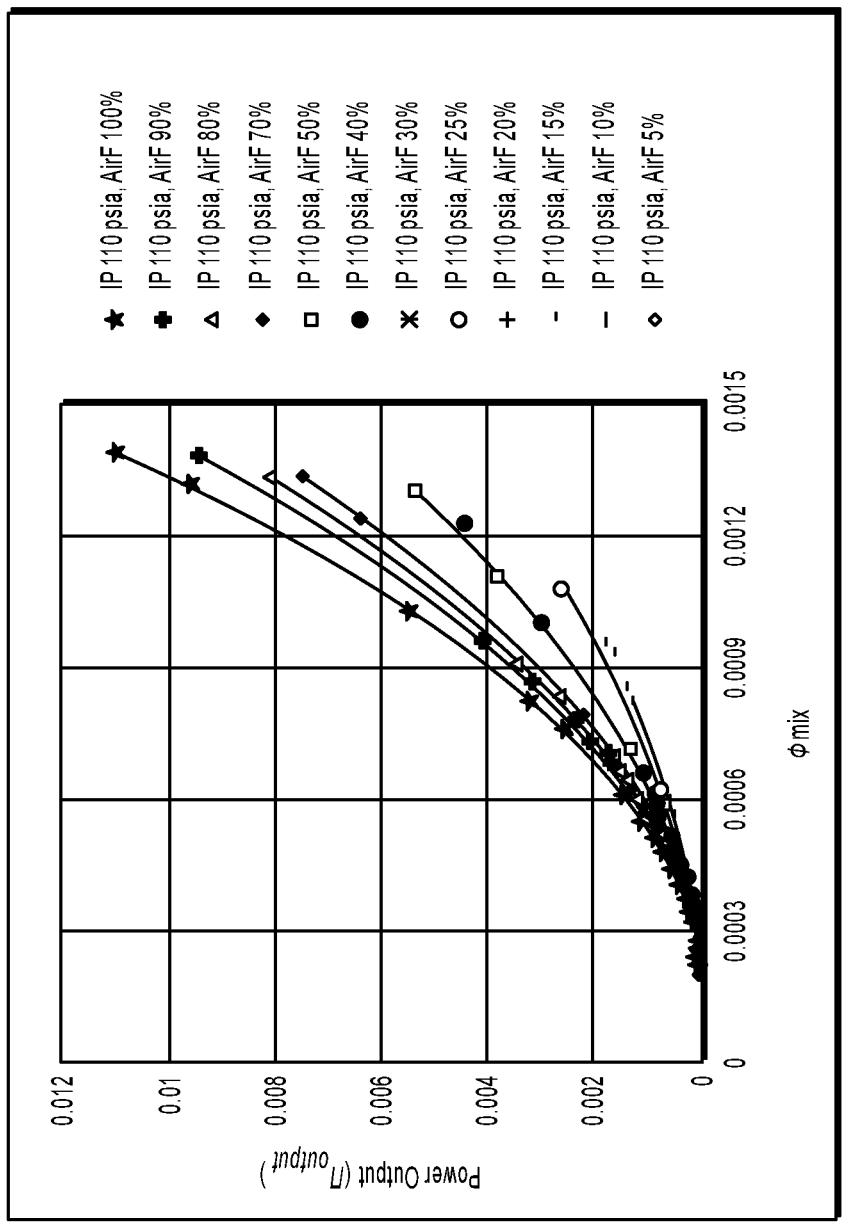
FIG. 14 shows power output coefficient ($\Pi_{mix}$) to represent turbine power output as a function of different air mass fractions for specific inlet pressure.
Figure 15:
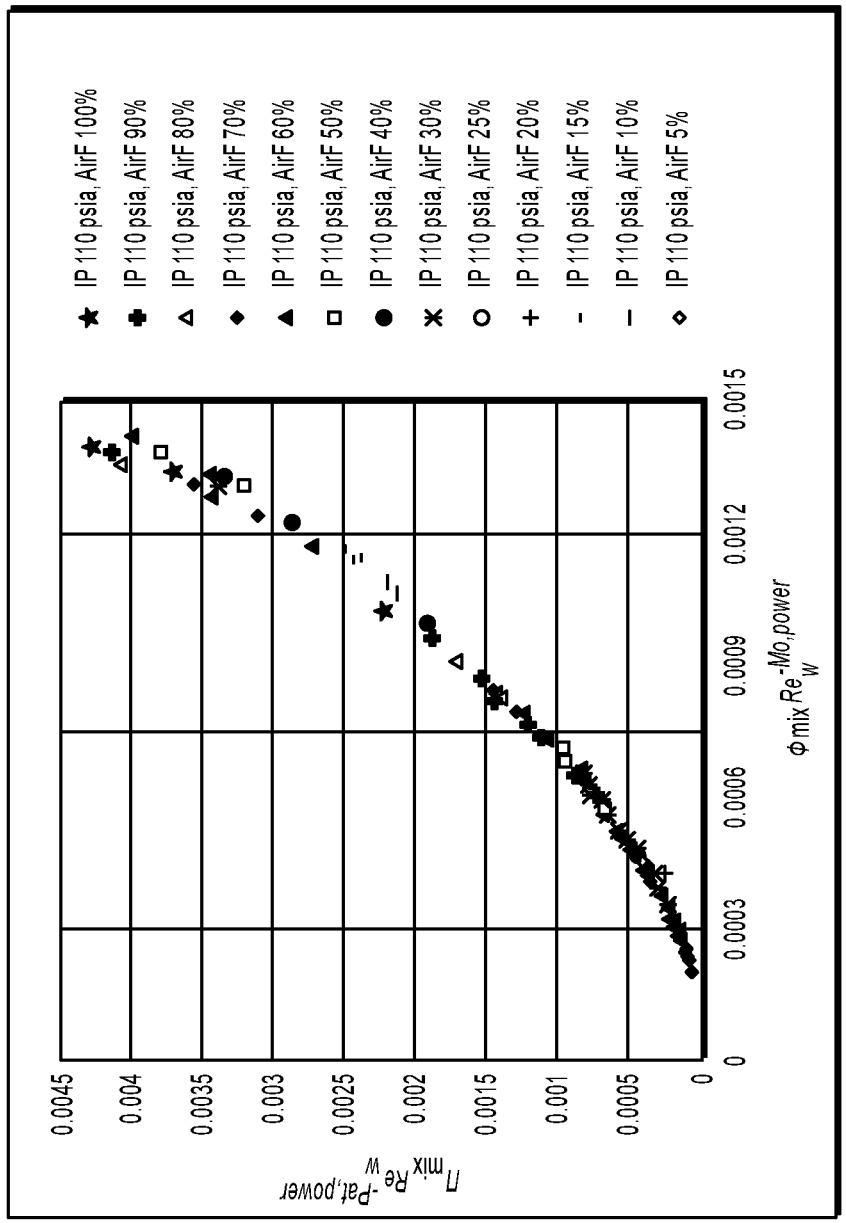
FIG. 15 shows plots of $\Pi_{mix} Re_w^{-Pat,power}$ against new X-axis, $\phi_{mix} Re_w^{-Mo,power}$, Mo and Pat are dimensionless numbers used to characterize the effect of variation in fluid properties and composition (two-phase flow, viscosity etc) using the single phase flow.

As shown in FIGS. 14-15, corrected pressure difference can be calculated by using predicted rotational speed for two-phase flow and formulated equation.

$$\Psi_{air} \cdot Re_{\omega,air}^{-Pat,air} = \Psi_{mix} \cdot Re_{\omega,mix}^{-Pat,mix} \quad (22)$$

As shown in FIGS. 14-15, corrected turbine power output can be calculated by using predicted rotational speed for two phase flow and formulated equation.

$$\Pi_{air} \cdot Re_{\omega,air}^{-Pat,air,power} = \Pi_{mix} \cdot Re_{\omega,mix}^{-Pat,mix,ower} \quad (23)$$

FIGS. 13 and 17A-D shows the revised head (pressure difference) and turbine power output predictions respectively against the recorded data, Data agrees well down to 5% air mass fraction.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A method for measuring parameters of a liquid using a multi-phase flow meter, the method comprising:
    measuring pressure drops across the multi-phase flow meter, the multi-phase flow meter comprising:
        a flow conduit;
        a rotor positioned in the flow conduit, the rotor comprising a plurality of blades;
        a first pressure sensor disposed upstream of the rotor;
        a first temperature sensor disposed upstream of the rotor;
        a second pressure sensor disposed downstream of the rotor;
        a second temperature sensor disposed downstream of the rotor;
        a pulse sensor disposed in the flow conduit proximate the plurality of blades;
        a nozzle disposed positioned in the flow conduit upstream of the rotor; and
        a control unit is electrically coupled to the first pressure sensor, the second pressure sensor, and the pulse sensor, and the control unit is configured to determine a gas volume fraction from an output of the first pressure sensor, the second pressure sensor, and the pulse sensor;
    measuring pressure upstream of the multi-phase flow meter; and
    identifying at least one fluid parameter based, at least in part, on a correlation of a change in a multiphase flow parameter to pulse output.

2. The method of claim 1, wherein the at least one fluid parameter is flow rate.

3. The method of claim 1, wherein the at least one fluid parameter is gas volume fraction.

4. A measuring apparatus for measuring parameters of a liquid, the measuring apparatus comprising:
    an electronic control unit operable to measure pressure drops across the measuring apparatus, measure pressure upstream of the measuring apparatus, correlate a change in a multiphase parameter to measured pulse output of the measuring apparatus, and to determine a gas volume fraction from an output of a first pressure sensor disposed upstream of the measuring apparatus, a second pressure sensor disposed downstream of the measuring apparatus, and a pulse sensor disposed in a flow conduit proximate to the measuring apparatus.

5. The measuring apparatus of claim 4, wherein the measuring apparatus is a flow meter.

6. The measuring apparatus of claim 5, wherein the flow meter comprises a flow conditioner.

7. The measuring apparatus of claim 5, wherein the flow meter comprises a nozzle at an inlet of the flow meter.

8. The measuring apparatus of claim 4, wherein the measuring apparatus is a pump.

9. The measuring apparatus of claim 4, comprising a turbine operable to generate power for the electronic control via fluid flow through the measuring apparatus.

10. The measuring apparatus of claim 4, wherein the measuring apparatus is an inline turbine.

11. A multi-phase flow meter comprising:
    a flow conduit;
    a rotor positioned in the flow conduit, the rotor comprising a plurality of blades;
    a first pressure sensor disposed upstream of the rotor;
    a first temperature sensor disposed upstream of the rotor;
    a second pressure sensor disposed downstream of the rotor;
    a second temperature sensor disposed downstream of the rotor;
    a pulse sensor disposed in the flow conduit proximate the plurality of blades;
    a nozzle disposed positioned in the flow conduit upstream of the rotor, and wherein a control unit is electrically coupled to the first pressure sensor, the second pressure sensor, and the pulse sensor, and the control unit is configured to determine a gas volume fraction from an output of the first pressure sensor, the second pressure sensor, and the pulse sensor.

12. The multi-phase flow meter of claim 11, wherein the first pressure sensor and the second pressure sensor measure a pressure drop across the rotor.

13. The multi-phase flow meter of claim 11, wherein the pulse sensor measures a fluid pulse induced by the plurality of blades.

14. The multi-phase flow meter of claim 11, comprising a generator coupled to the rotor.

15. The multi-phase flow meter of claim 14, wherein the generator produces electrical power that is supplied to an electric load.

16. The multi-phase flow meter of claim 11, wherein phase flow rates are calculated from the gas volume fraction.

17. The multi-phase flow meter of claim 11, wherein the rotor is a pump.

18. The multi-phase flow meter of claim 11, comprising a stator positioned upstream of the rotor.

* * * * *